(12) United States Patent
Youn et al.

(10) Patent No.: US 11,023,525 B2
(45) Date of Patent: Jun. 1, 2021

(54) ELECTRONIC DEVICE AND METHOD FOR PROVIDING CONTENT

(71) Applicant: Samsung Electronics Co., Ltd., Gyeonggi-do (KR)

(72) Inventors: So-Young Youn, Seoul (KR); Ji-Hun Ha, Seoul (KR)

(73) Assignee: Samsung Electronics Co., Ltd

( * ) Notice: Subject to any disclaimer, the term of this patent is extended or adjusted under 35 U.S.C. 154(b) by 163 days.

(21) Appl. No.: 15/591,774

(22) Filed: May 10, 2017

(65) Prior Publication Data

US 2017/0329865 A1 Nov. 16, 2017

(30) Foreign Application Priority Data

May 10, 2016 (KR) .................. 10-2016-0057083

(51) Int. Cl.
| | | |
|---|---|---|
| *G06F 17/00* | (2019.01) | |
| *G06F 16/901* | (2019.01) | |
| *H04L 29/08* | (2006.01) | |
| *G06F 16/23* | (2019.01) | |
| *G06F 16/16* | (2019.01) | |
| *G06F 16/2455* | (2019.01) | |
| *G06F 16/907* | (2019.01) | |

(52) U.S. Cl.
CPC ........ *G06F 16/9017* (2019.01); *G06F 16/162* (2019.01); *G06F 16/23* (2019.01); *G06F 16/2455* (2019.01); *G06F 16/907* (2019.01); *H04L 67/10* (2013.01); *H04L 67/327* (2013.01)

(58) Field of Classification Search
CPC .......... G06F 16/11; G06F 16/13; G06F 16/24; G06F 16/156; H04L 12/66
See application file for complete search history.

(56) References Cited

U.S. PATENT DOCUMENTS

| | | | | |
|---|---|---|---|---|
| 8,554,897 B2* | 10/2013 | Kim | ............... | H04L 65/403 709/223 |
| 2010/0251304 A1* | 9/2010 | Donoghue | ......... | H04N 5/44543 725/46 |
| 2013/0145048 A1* | 6/2013 | Lee | ............... | H04L 12/2836 709/248 |

(Continued)

FOREIGN PATENT DOCUMENTS

| | | |
|---|---|---|
| EP | 2 763 427 | 8/2014 |
| KR | 100871873 | 12/2008 |

(Continued)

OTHER PUBLICATIONS

International Search Report dated Sep. 29, 2017 issued in counterpart application No. PCT/KR2017/004570, 8 pages.

*Primary Examiner* — Hung D Le
(74) *Attorney, Agent, or Firm* — The Farrell Law Firm, P.C.

(57) ABSTRACT

An electronic device and a method for providing content within a home network are provided. The electronic device includes a communication interface that receives first content generated by a controlled device, and a processor configured to map the received first content to a target device to which the received first content is to be provided, acquire second content related to the first content, and when a content provision condition is met, transmit at least one of the first content and the second content to the target device.

20 Claims, 22 Drawing Sheets

(56) References Cited

U.S. PATENT DOCUMENTS

| | | | | |
|---|---|---|---|---|
| 2013/0170813 A1* | 7/2013 | Woods | ............... | H04N 5/765 |
| | | | | 386/200 |
| 2013/0198642 A1* | 8/2013 | Carney | ............... | H04N 21/482 |
| | | | | 715/738 |
| 2013/0204825 A1* | 8/2013 | Su | ............... | G06N 5/04 |
| | | | | 706/46 |
| 2015/0128073 A1* | 5/2015 | Ahn | ............... | G06F 3/0488 |
| | | | | 715/759 |
| 2015/0172731 A1* | 6/2015 | Hasek | ............... | H04N 21/2541 |
| | | | | 725/28 |
| 2015/0181283 A1* | 6/2015 | Maciej | ............... | H04N 21/4181 |
| | | | | 725/31 |
| 2016/0007055 A1* | 1/2016 | Yim | ............... | G06F 16/51 |
| | | | | 725/116 |
| 2016/0080810 A1* | 3/2016 | Dutta | ............... | H04N 21/43615 |
| | | | | 725/38 |
| 2016/0112394 A1* | 4/2016 | Sahu | ............... | H04L 63/08 |
| | | | | 726/7 |
| 2016/0112768 A1* | 4/2016 | Kim | ............... | H04N 21/8133 |
| | | | | 725/19 |
| 2019/0361694 A1* | 11/2019 | Gordon | ............... | G06F 9/543 |

FOREIGN PATENT DOCUMENTS

| | | |
|---|---|---|
| KR | 1020110043183 | 4/2011 |
| KR | 101394291 | 6/2014 |
| KR | 101519856 | 5/2015 |
| KR | 1020150051292 | 5/2015 |
| KR | 1020150062503 | 6/2015 |
| KR | 1020160029625 | 3/2016 |

\* cited by examiner

ELECTRONIC DEVICE AND METHOD FOR PROVIDING CONTENT

PRIORITY

This application claims priority under 35 U.S.C. § 119(a) to Korean Patent Application Serial No. 10-2016-0057083, which was filed in the Korean Intellectual Property Office on May 10, 2016, the entire content of which is incorporated herein by reference.

BACKGROUND

1. Field of the Disclosure

The present disclosure relates generally to an electronic device and a method for providing content and, more particular, to an electronic device and a method for providing content to a target device within a home network.

2. Description of the Related Art

Recently, the development and supply of smart devices linked with networks have actively progressed, and the Internet of things (IoT), which intelligently forms a mutual cooperative relation between the smart devices through the network link, has become a big issue. Due to a change in the environment in which the smart device is used and the rapid development of wireless network environments, a paradigm has moved from a PC-based computing environment to a mobile device-based wireless computing environment within a home. Further, as information home appliances and white goods have developed to become smart home appliances and IoT devices, such as various types of wearable devices based on the smart device, enter the home network environment, a new type of smart home service has been attempted through a collaboration between the existing home appliances and the IoT devices.

According to the existing technologies, when finding useful information related to daily life while using smart devices or IoT devices, a user may store the information by capturing the information or making a bookmark of a Uniform Resource Locator (URL) containing relevant information. However, as time goes by, the user may forget even storing the relevant information, and thus may not use the stored information or may repeat a process of finding the stored information.

SUMMARY

The present disclosure has been made to address the above-mentioned problems and disadvantages, and to provide at least the advantages described below.

Accordingly, an aspect of the present disclosure is to provide a content transferring system and method within a smart home for storing useful content by capturing relevant content or making a bookmark when finding the useful content while using, for example, smart devices or IoT devices, and generating and storing a map (for example, a meta information table) in which metadata including at least one keyword extracted from the stored relevant content and a target device to which the stored relevant content is transmitted are mapped to each other, so as to transmit the stored relevant content to the corresponding target device.

Accordingly, another aspect of the present disclosure is to display, reproduce, and provide useful information discovered by a user through a smart device, to another device at a proper time and place without a separate note or bookmark, thereby improving user convenience.

Accordingly, another aspect of the present disclosure is to automatically collect and provide, not only information captured by a user, but also, secondary information related to the captured information without a user's control.

Accordingly, another aspect of the present disclosure is to provide collected content by automatically displaying or reproducing the content in a corresponding device without a user's control according to a pattern of a content provision environment repeated by the user.

In accordance with an aspect of the present disclosure, an electronic device for providing content is provided. The electronic device includes a communication interface that receives first content generated by a controlled device, and a processor configured to map the received first content to a target device to which the received first content is to be provided, acquire second content related to the first content, and when a content provision condition is met, transmit at least one of the first content and the second content to the target device.

In accordance with another aspect of the present disclosure, a method of providing content by an electronic device is provided. The method includes receiving first content generated by a controlled device, mapping the received first content to a target device to which the received first content is to be provided, acquiring second content related to the first content, and transmitting at least one of the first content and the second content to the target device, when a content provision condition is met.

In accordance with another aspect of the present disclosure, an electronic device for providing content is provided. The electronic device includes a communication interface that receives a control signal, an output module that outputs content according to the received control signal, and a processor configured to generate first content by capturing at least a part of the output content, transmit the generated first content to a server, receive at least one of the first content and second content related to the first content, from the server, when a content provision condition is met, and output at least one of the received first content and the second content, through the output module.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
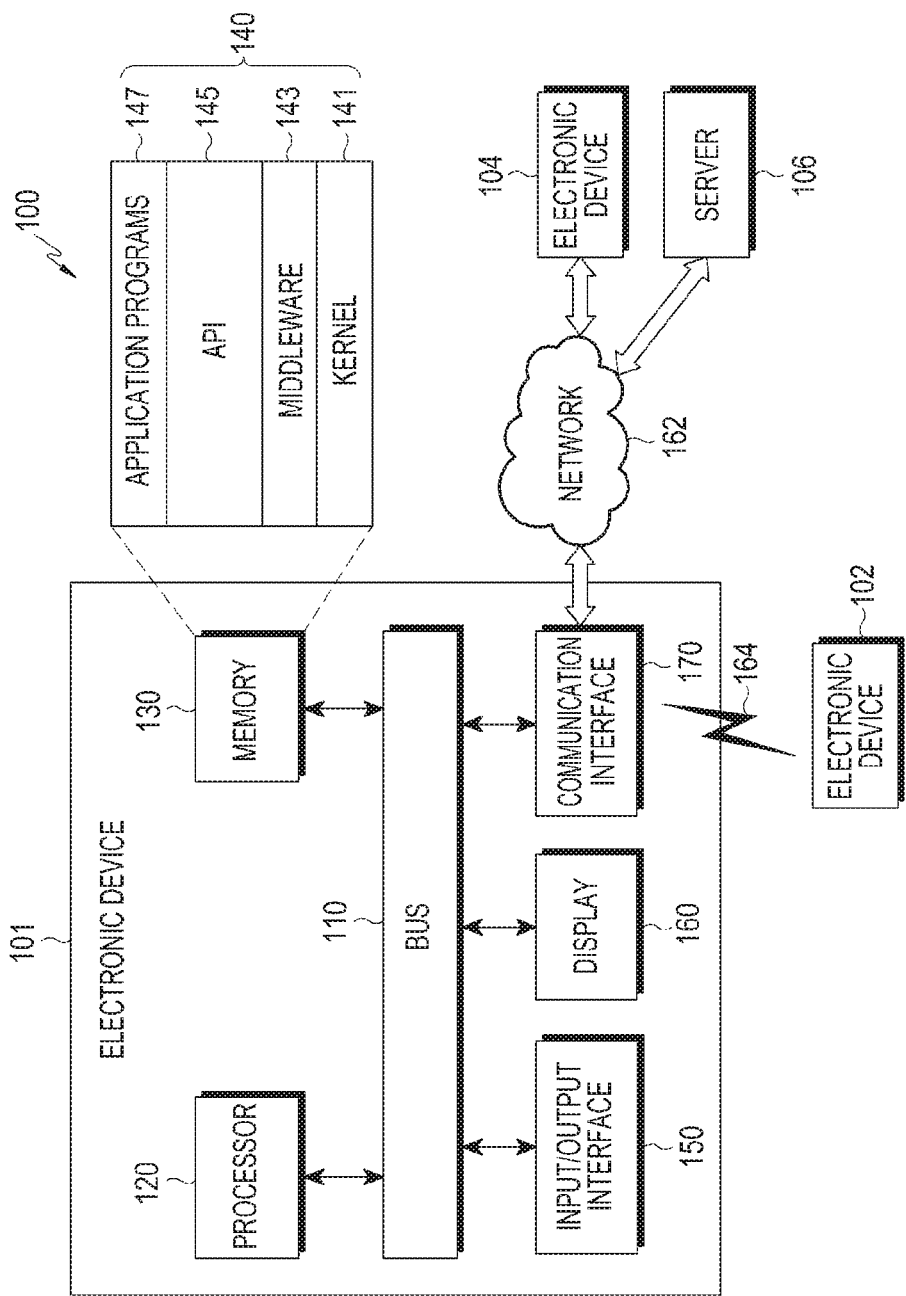
FIG. 1 is a block diagram of a network environment including an electronic device, according to an embodiment of the present disclosure.

Various embodiments of the present disclosure will be described with reference to the accompanying drawings, in which similar reference numerals may be used to designate similar elements. However, it should be understood that there is no intent to limit the present disclosure to the particular forms disclosed herein. Rather, the present disclosure should be construed to cover various modifications, equivalents, and/or alternatives of the embodiments described herein. The expressions "have", "may have", "include", or "may include" refer to the existence of a corresponding feature (e.g., numeral, function, operation, or constituent element such as component), and do not exclude one or more additional features.

The expressions "A or B", "at least one of A or/and B", and "one or more of A or/and B" may include all possible combinations of the items listed. For example, the expression "A or B", "at least one of A and B", or "at least one of A or B" may include (1) A, (2) B, or (3) both A and B.

Expressions such as "first", "second", etc. may modify various components regardless of the order and/or the importance, but do not limit the corresponding components. For example, a first user device and a second user device indicate different user devices, although both are user devices. For example, a first element may be referred to as a second element, and similarly, a second element may be referred to as a first element without departing from the scope of the present disclosure.

When an element (e.g., a first element) is referred to as being "connected," or "coupled," to another element (e.g., a second element), the element may be directly connected or coupled directly to the other element or any other element (e.g., a third element) may be interposed between the elements. In contrast, when an element (e.g., a first element) is referred to as being "directly connected," or "directly coupled" to another element (e.g., a second element), there are no elements (e.g., a third element) interposed between the elements.

The expression "configured to" may be used interchangeably with the expressions "suitable for", "having the capability to", "designed to", "adapted to", "made to", and "capable of". The term "configured to" may not necessarily imply "specifically designed to" in hardware. Alternatively, in some situations, the expression "device configured to" may mean that the device, together with other devices or components, "is able to". For example, the phrase "processor configured to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of the present disclosure.

A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equivalent to the contextual meanings in the relevant field of art, and are not to be interpreted to have ideal or excessively formal meanings, unless clearly so defined in the present disclosure. In some cases, even a term defined in the present disclosure should not be interpreted to exclude embodiments of the present disclosure.

An electronic device, according to various embodiments of the present disclosure, may include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of a television, a digital versatile disk (DVD) player, an audio device, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of a medical device (e.g., a portable medical measuring device (e.g., a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), an avionics device, a security device, an automotive head unit, a robot, an automatic teller machine (ATM), a point of sales (POS) device, or an IoT device (e.g., a light bulb, a sensor, an electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

According to an embodiment of the present disclosure, the electronic device may also be a flexible device.

The electronic device may be a combination of one or more of the aforementioned various devices. Further, the electronic is not limited to the aforementioned devices, and may include a new electronic device according to the development of technology.

Hereinafter, an electronic device according to various embodiments will be described with reference to the accompanying drawings. The term "user" may indicate a person using the electronic device or a device (e.g., an artificial intelligence electronic device) using the electronic device.

FIG. 1 is a block diagram of a network environment including an electronic device, according to an embodiment of the present disclosure.

Referring to FIG. 1, an electronic device 101 within a network environment 100 is provided. The electronic device 101 includes a bus 110, a processor 120, a memory 130, an input/output interface 150, a display 160, and a communication interface 170. The electronic device 101 may omit at least one of the elements, or may further include other elements.

The bus 110 is a circuit that connects the elements 120, 130, and 150 to 170 of the electronic device 101 and transfers communication (e.g., control messages and/or data) between the elements.

The processor 120 includes one or more of a central processing unit (CPU), an application processor (AP), and a communication processor (CP). The processor 120 carries out operations or data processing relating to the control and/or communication of at least one other element of the electronic device 101. The processor 120 may be called a controller, or may include a controller as a part thereof or may constitute a part of the controller.

The memory 130 includes a volatile and/or non-volatile memory. The memory 130 stores instructions or data relevant to at least one other element of the electronic device 101. The memory 130 stores software and/or a program 140. The program 140 includes a kernel 141, a middleware 143, an application programming interface (API) 145, and/or application programs (or "applications") 147. At least some of the kernel 141, the middleware 143, and the API 145 may be referred to as an operating system (OS).

The kernel 141 controls or manages system resources (for example, the bus 110, the processor 120, or the memory 130) used for executing an operation or function implemented by other programs (for example, the middleware 143, the API 145, or the applications 147). Furthermore, the kernel 141 may provide an interface through which the middleware 143, the API 145, or the applications 147 may access the individual elements of the electronic device 101 to control or manage the system resources.

The middleware 143 functions as an intermediary for allowing the API 145 or the applications 147 to communicate with the kernel 141 to exchange data.

Furthermore, the middleware 143 may process one or more task requests, which are received from the applications 147, according to priorities assigned to the applications 147. For example, the middleware 143 may assign priorities for using the system resources (for example, the bus 110, the processor 120, the memory 130, etc.) of the electronic device 101 to one or more of the applications 147. For example, the middleware 143 may perform scheduling or load balancing on the one or more task requests by processing the one or more task requests according to the priorities assigned to the one or more applications 147.

The API 145, which is an interface through which the applications 147 control functions provided from the kernel 141 or the middleware 143, may include at least one interface or function for file control, window control, image processing, text control, etc.

The input/output interface 150 functions as an interface that can forward instructions or data, which are input from a user or an external device, to the other elements of the electronic device 101. Furthermore, the input/output interface 150 may output instructions or data, which are received from the other elements of the electronic device 101, to the user or the external device.

The display 160 may include a liquid crystal display (LCD), a light-emitting diode (LED) display, an organic light-emitting diode (OLED) display, a microelectromechanical systems (MEMS) display, and an electronic paper display. The display 160 displays various types of content (for example, text, images, videos, icons, symbols, etc.). The display 160 may include a touch screen and may receive, for example, a touch, gesture, proximity, or hovering input using an electronic pen or a user's body part.

The communication interface 170 may establishes communication between the electronic device 101 and a first external electronic device 102, a second external electronic device 104, or a server 106. For example, the communication interface 170 is connected through short range communication 164 to communicate with the first external electronic device 102 and is connected to a network 162 through wireless or wired communication to communicate with the second external electronic device 104 or the server 106. The communication interface 170 may include a CP, and the CP may constitute one of a plurality of modules that constitute the communication interface 170. The communication processor may also be included in the processor 120.

The wireless communication may use at least one of long term evolution (LTE), LTE-advance (LTE-A), code division multiple access (CDMA), wideband CDMA (WCDMA), universal mobile telecommunications system (UMTS), wireless broadband (WiBro)), or global system for mobile communications (GSM) as a cellular communication protocol. In addition, the wireless communication may include the short range communication 164. The short range communication 164 may include at least one of, for example, Wi-Fi, Bluetooth (BT), Bluetooth low energy (BLE), Zigbee, Z-wave, magnetic secure transmission (MST), near field communication (NFC), global navigation satellite system (GNSS), etc. The GNSS may include at least one of a global positioning system (GPS), a global navigation satellite system (Glonass), a Beidou navigation satellite system (Beidou), and Galileo, the European global satellite-based navigation system, according to the place of usage or bandwidth thereof. The term "GPS" may be used interchangeably with the term "GNSS".

The wired communication may include at least one of a universal serial bus (USB), a high definition multimedia interface (HDMI), recommended standard 232 (RS-232), a plain old telephone service (POTS), etc.

The network 162 may include at least one of a communication network such as a computer network (e.g., a LAN or a WAN), the Internet, and a telephone network.

Each of the first and second external electronic devices 102 and 104 may be of the same or a different type from the electronic device 101. The server 106 may include a group of one or more servers. All or some of the operations executed in the electronic device 101 may be executed in another electronic device or a plurality of electronic devices 102, 104, or the server 106. When the electronic device 101 has to perform some functions or services automatically or in response to a request, the electronic device 101 may request another device to perform at least some functions relating thereto instead of, or in addition to, performing the functions or services by itself. The other electronic device may perform the requested functions or the additional functions and may transfer the execution result to the electronic device 101. The electronic device 101 may provide the received result as it is, or may additionally process the received result to provide the requested functions or services. To this end cloud computing, distributed computing, or client-server computing technology may be used.

Figure 2:
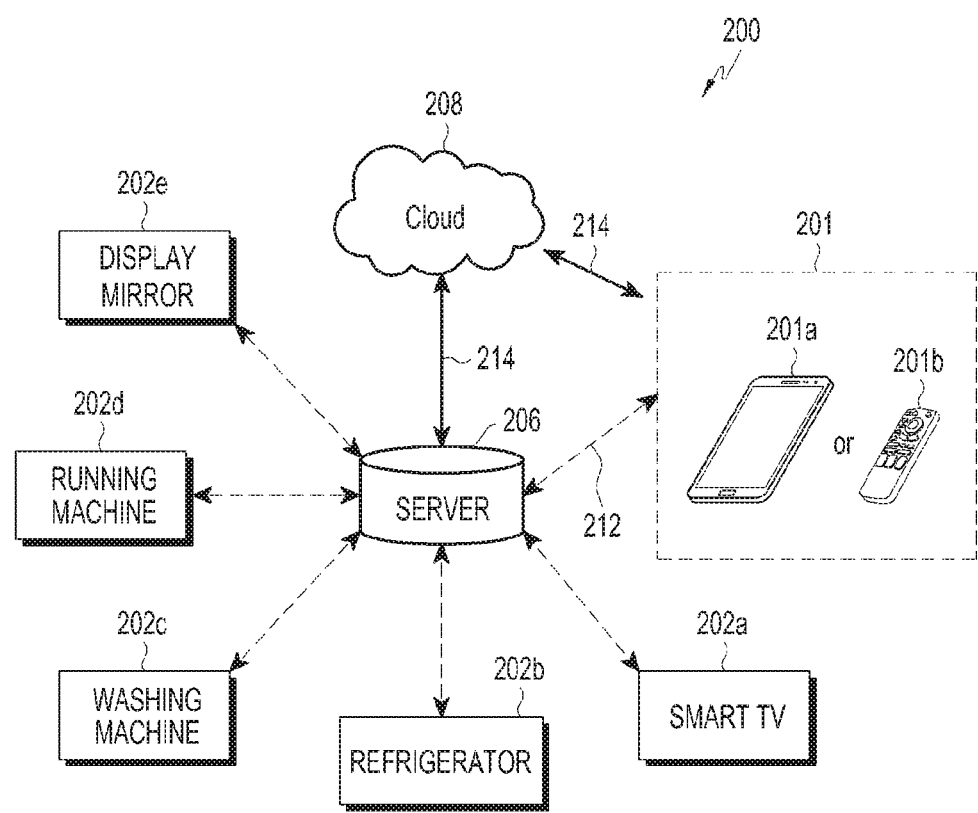
FIG. 2 is a block diagram of a home network environment for transferring content, according to an embodiment of the present disclosure.

FIG. 2 is a block diagram of a home network environment for transferring content, according to an embodiment of the present disclosure.

Referring to FIG. 2, a home network 200 is provided. The home network 200 includes a control device 201, such as smart phone 201a and a remote controller 201b, a plurality of controlled devices, such as a display smart TV 202a, a refrigerator 202b, a washing machine 202c, a running machine 202d, and a display mirror 202e, and a server 206. At least one of the plurality of controlled devices 202a to 202e may also serve as the control device. As described hereinafter, it is assumed that the smart phone 201a serves as both a controlled device and a control device.

The control device 201 communicates with the controlled devices 202a to 202e and/or the server 206 through a first network 212 and communicates with a registered server, such as a cloud 208, through a second network 214 for a smart home service.

The first network 212 may provide short-range communication-based data. For example, the first network 212 may include at least one of Wi-Fi, Bluetooth, NFC, ZigBee, Z-Wave, and GNSS.

The second network 214 may provide a packet data or an Internet protocol-based service. For example, the second network 214 may include at least one of a computer network (for example, a LAN or a WAN), the Internet, and a telephone network.

The controlled devices 202a to 202e are devices registered in the server 206, which provides the smart home service, and include smart devices and/or the IoT devices connected to the home network 200 for the smart home service.

The controlled devices 202a to 202e generate first content according to a control of a user or the control device 201. For example, when the user discovers useful information while watching a broadcast through a controlled device, such as the smart TV 202a, the user may directly control the smart TV 202a by capturing at least a part of the corresponding broadcast to generate the first content or may transmit a content generation control signal to the smart TV 202a to capture at least the part of the corresponding broadcast through the control device 201. The smart TV 202a generates the predetermined first content by capturing at least a part of the content according to the content generation control signal received from the control device 201. The smart TV 202a transmits the generated first content to the server 206. The server 206 stores the first content received from the controlled devices 202a to 202e in a memory. The server 206 may acquire second content related to the first content from the Internet or the like. The second content may include, for example, a broadcast program, a video, text (for example, articles, postings in a blog, or a webpage), or audio data (for example, a sound source or voice data) related to the first content. The server 206 stores the acquired second content in the memory.

The server 206 further generates a first meta information table to map the received first content to at least one target device among the controlled devices 202a to 202e to which the first content is to be provided. For example, the server 206 extracts first metadata from the received first content. The server 206 generates the first meta information table by matching the extracted first metadata and a content provision condition corresponding to the first content. Subsequently, when the content provision condition is met based on the generated first meta information table, outputs at least one of the first content and the second content on a display of at least one target device stored in the first meta information table or changes, based on a setting parameter extracted from at least one of the first content and the second content, a corresponding setting parameter of the corresponding target device.

When the at least one target device has no display, the server 206 may transmit at least one of the first content and the second content to another device such as, the smart phone 201a. A detailed description of the server 206 will be made with reference to FIG. 3.

Figure 3:
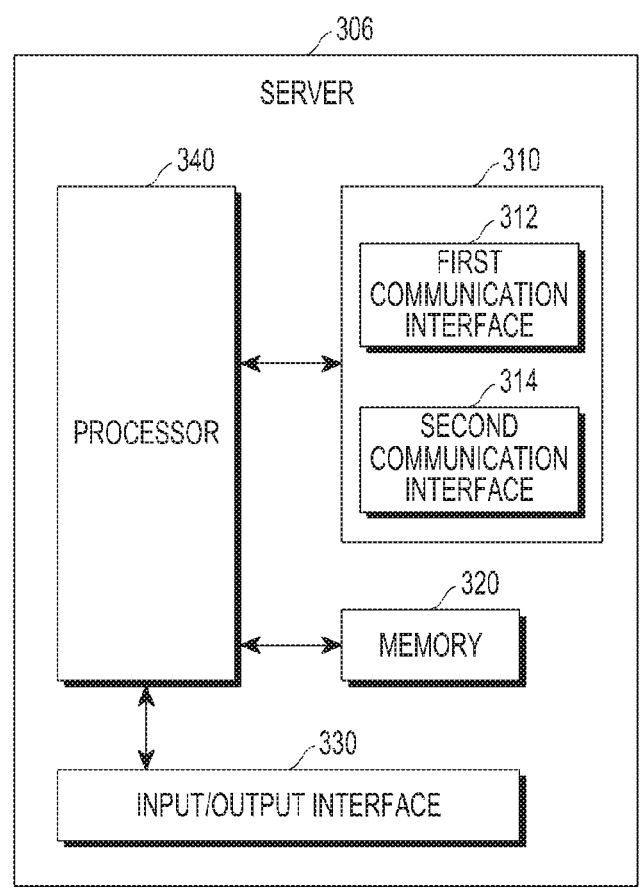
FIG. 3 is a block diagram of a server within a home network, according to an embodiment of the present disclosure.

FIG. 3 is a block diagram of a server within a home network, according to an embodiment of the present disclosure.

Referring to FIG. 3, a server 306 is provided. The server 306 includes a communication circuit 310, a memory 320, an input/output interface 330, and a processor 340. The communication circuit 310 establishes a communication connection with an external electronic device and includes a first communication interface 312 and a second communication interface 314. The communication circuit 310 may be referred to as a communication unit or a communication module, may include the communication unit or the communication module as a part thereof, or may constitute the communication unit or the communication module.

The first communication interface 312 may provide short-range communication-based data. For example, the communication circuit 310 may establish a communication connection with at least one of the controlled devices 202a to 202e and/or the control device 201 (for example, the smart phone 201a and the remote controller 201b) connected to the first network 212 through the first communication interface 312. For example, the first communication interface 312 may include at least one of Wi-Fi, Bluetooth, NFC, ZigBee, Z-Wave, and GNSS.

The second communication interface 314 may provide a packet data or Internet protocol-based service. For example, the communication circuit 310 may perform communication with the external server (for example, cloud 208) and/or the control device 201 (for example, the smart phone 201a and the remote controller 201b) connected to the second network 214 through the second communication interface 314. For example, the second communication interface 314 may include at least one of a computer network (for example, a LAN or a WAN), the Internet, and a telephone network.

The communication circuit 310 receives first content from at least one of the controlled devices 202a to 202e (for example, the smart TV 201a) connected to the first network 212 through the first communication interface 312. Further, the communication circuit 310 transmits the received first content to at least one target device (for example, the refrigerator 202b) mapped in the first meta information table to receive the first content according to a content provision condition, among at least one of the controlled devices 202a to 202e connected to the first network 212 through the first communication interface 312.

In addition, the communication circuit 310 transmits the received first content to the cloud 208 connected to the second network 214 through the second communication interface 314.

The memory 320 stores instructions or data related to at least one other element of the server 306. The memory 320 may include a part or entirety of the memory 130 illustrated in FIG. 1. The memory 320 further stores the first content received through the communication circuit 310. In addition, the memory 320 stores the second content acquired in connection with the received first content.

The input/output interface 330 may include a part or entirety of the input/output interface 150 illustrated in FIG. 1, or include at least one of an input device, a display, or an audio module. The input device may include a touch panel, a (digital) pen sensor, a key, or an ultrasonic input device. The display may include a panel, a hologram device, and/or a projector. The audio module bi-directionally converts a sound and an electric signal. The audio module processes sound information input or output through, for example, a speaker, a receiver, earphones, or a microphone.

Further, the input/output interface 330 may receive at least one of first metadata and second metadata from the user.

The processor 340 generally controls the server 306. The processor 340 may include a part or entirety of the processor 120 illustrated in FIG. 1. The processor 340 stores, in the memory 320, the first content received from at least one of the controlled devices 202a to 202e and at least one target device to which the received first content is to be provided, which are mapped to each other. The first content may include, for example, a broadcast program, a video, text (for example, articles, postings in a blog, or a webpage), and audio data (for example, a sound source or sound data).

Further, the processor 340 generates the first meta information table to map the received first content to at least one target device among at least one controlled device 202a to 202e corresponding to the received first content. For example, the processor 340 extracts first metadata related to the first content from the received first content. The extracted first metadata may include tag information included in the received first content, electronic program guide (EPG) information, at least one first keyword extracted from at least a part of the tag information or the EPG information, or a combination thereof.

Further, the processor 340 generates the first meta information table by mapping the first content, the first metadata extracted from the first content, and/or a content provision condition corresponding to the first content. The content provision condition may include at least one of a device type of at least one target device mapped in accordance with the extracted first metadata (e.g., a first keyword), data on an area (e.g., a place/space) in which the at least one target device is located, and time data for operating the at least one target device.

For example, the processor 340 maps the extracted first metadata, such as at least one first keyword extracted from the first content, with type of the at least one target device to which the first content is to be provided, the area in which the at least one target device is installed, and the time at which the at least one target device is to be operated, generates the first meta information table as illustrated in Table 1, and stores the first meta information table in the memory 320.

TABLE 1

| Extracted First Metadata (e.g., First Keyword) | Target Device | Target Device Type | Target Device Area | Target Device Operation Time |
| --- | --- | --- | --- | --- |
| Face-washing or bathroom | Display mirror 202e | In-bathroom display device | Bathroom | 19:00-21:00 |
| Cooking or recipe | Refrigerator 202b | Oven or refrigerator | Kitchen | 17:00-20:00 |
| Baseball or movie | Smart TV 202a | Smart TV | Living room | 07:00-09:00 |
| Book or movie | Smart phone 201a | Tablet or smart phone | Bedroom | 10:00-15:00 |

Referring to Table 1, when the first metadata extracted from the received first content includes at least one first keyword, such as "face-washing" or "bathroom", a device type of a target device corresponding to the at least one first keyword may be an in-bathroom display device (for example, the display mirror 202e), an area in which the display mirror 202e is installed may be the bathroom, and a time for which the display mirror 202e is to be operated may be 19:00 to 21:00.

Similarly, when the first metadata extracted from the received first content includes at least one first keyword, such as "cooking" or "recipe", a device type of a corresponding target device corresponding to the at least one first keyword may be an oven or a refrigerator (for example, the refrigerator 202b), an area in which the oven or the refrigerator 202b is installed may be a kitchen, and a time for which the oven or the refrigerator 202b is to be operated may be 17:00 to 20:00.

When the content provision condition is met based on the generated first meta information table, for example, when the user approaches the area set in the first meta information table or the time set in the first meta information table arrives, the processor 340 transmits the first content to the at least one target device stored in the first meta information table The processor 340 may control the at least one target device to provide the first content to the user. For example, after transmitting the first content to the at least one target device, the processor 340 may control the first content to be output through an output device (for example, a display or an audio module) of the at least one target device.

According to an embodiment, when the first content is visual data, such as a text, an image, or a document, the processor 340 may control the at least one target device to display or reproduce the first content on the display of the corresponding target device.

According to an embodiment, when the first content is auditory data, such as a music file, an audio file, or a voice file, the processor 340 may control the at least one target device to output the first content through the audio module of the corresponding target device.

According to an embodiment, when the first content is multimedia content, such as a video or an image, the processor 340 may control the at least one target device to output the first content through various output devices such as the display or the audio module of the corresponding target device.

According to an embodiment, the processor 340 may receive the device type of the target device stored in the first meta information table from the user or the device type may be automatically set by at least one extracted keyword.

For example, the processor 340 may receive the device type of the target device to be mapped with the first content and at least one keyword extracted from the first content from the user and generate the first meta information table.

Alternatively, the processor 340 may pre-store a preset second meta information table with respect to each of the controlled devices 202a to 202e. For example, the processor 340 may make a request for the pre-stored second meta information table to each of the controlled devices 202a to 202e and receive the second meta information table from at least one of the controlled devices 202a to 202e. The processor 340 stores the preset second meta information table received from the controlled devices 202a to 202e in the memory 320. Alternatively, the processor 340 may download the preset second meta information table for each of the controlled devices 202a to 202e through the Internet and store the downloaded second meta information table in the memory 320. The preset second meta information table may be provided from a manufacturing company of each of the controlled devices 202a to 202e.

For example, when the controlled device is the refrigerator 202b, it is assumed that a second keyword set in the preset second meta information table for the refrigerator 202b includes "refrigerator", "cooking", or "recipe". In this case, the processor 340 compares the generated first meta information table and the preset second meta information table, and may automatically set the controlled device 202a to 202e including the second keyword in the preset second meta information table which is the same as the first keyword in the first meta information table to be the target device corresponding to at least one extracted first keyword. For example, when at least one first keyword extracted from the received first content includes "refrigerator", "cooking", and "recipe", the processor 340 compares the at least one extracted first keyword and at least one second keyword included in at least one of the preset second meta information tables and automatically sets the target device in the first meta information table corresponding to a second keyword that matches the at least one extracted first keyword to be the target device corresponding to the at least one first keyword extracted from the first content.

For example, at least one second meta information table may be represented as illustrated in Table 2.

TABLE 2

| Preset Second Metadata (e.g., Second Keyword) | Controlled Device | Controlled Device Type | Controlled Device Area |
|---|---|---|---|
| Face-washing or bathroom | Display mirror 202e | In-bathroom display device | Bathroom |

TABLE 2-continued

| Preset Second Metadata (e.g., Second Keyword) | Controlled Device | Controlled Device Type | Controlled Device Area |
|---|---|---|---|
| Cooking or recipe | Refrigerator 202b | Oven or refrigerator | Kitchen |
| Baseball or movie | Smart TV 202a | Smart TV | Living room |
| Book or movie | Smart phone 201a | Tablet or smart phone | Bedroom |

Referring to Table 2, the preset second meta information table may include at least one second keyword included in at least one second metadata corresponding to each of the controlled devices 202a to 202e. For example, at least one second keyword included in second metadata preset for the smart TV 202a may be at least one of "baseball" and "movie". Similarly, at least one second keyword included in second metadata preset for an oven or the refrigerator 202b may be at least one of "cooking" and "recipe".

The preset second meta information table may further include area data corresponding to the location of the corresponding controlled device. For example, second metadata preset for the smart TV 202a may further include a living room as area data on an area in which the smart TV 202a is installed. Similarly, the second metadata preset for the refrigerator 202b may further include a kitchen as area data on an area in which the refrigerator 202b is installed The generated first meta information table or the preset second meta information table may be directly edited or updated by a user's input through the input/output interface 330.

For example, with respect to the first meta information table, the processor 340 may receive parameters (for example, a device type, an area, and a time) of the content provision condition for a target device from the user and set the parameters. For example, the processor 340 may receive from the user a device type (for example, a bathroom display device) of the target device (for example, the display mirror 202e) to which the first content is to be provided, area data (for example, a bathroom or a location coordinate of the bathroom) on an area in which the target device is installed, or time data (for example, 19:00-21:00) on a time at which the target device is to be operated, and store the target device, the device type, the area data, and the time data in the first meta information table such that the target device, the device type, the area data, and the time data are mapped with the first meta data (for example, at least one first keyword included in the first meta data) extracted from the first content.

Further, the processor 340 may perform at least one of addition, change, and deletion of the first metadata extracted from the first content according to a user's input through the input/output interface 330 and edit and/or update the first meta information table.

For example, with respect to the second meta information table, the processor 340 may perform at least one of addition, change, and deletion of the preset second metadata corresponding a controlled device included in the second meta information table by a user's input through the input/output interface 330.

Further, the processor 340 transmits the generated or updated first meta information table to the cloud 208, through the second communication interface 314 to upload the first meta information table. In addition, the processor 340 transmits at least one received or downloaded second meta information table or at least one updated second meta information table to the cloud 208 through the second communication interface 314 to upload the second meta information table. Accordingly, even when the user generates first content outside, the user can generate and store useful content anywhere and at any time by uploading and/or downloading the content through the cloud 208.

According to an embodiment, the processor 340 acquires at least one second content related to the received first content based on the generated first meta information table. For example, when the first content corresponds to articles related to baseball and at least one first keyword extracted from the first content includes "baseball" and "Korean series", the processor 340 acquires second content (for example, a video of the corresponding game, highlights, or a game result) related to the first content from the Internet based on at least one extracted first keyword.

Further, the second content may be acquired and stored by the external server (e.g., cloud 208). In this case, the processor 340 downloads the second content from the cloud 208 through the second communication interface 314.

When the content provision condition is met, the processor 340 transmits at least one of the received first content and the acquired second content to the corresponding target device. The corresponding target device outputs at least one of the first content and the second content received from the processor 340 through an output device (for example, a display and/or an audio module) of the corresponding target device. For example, the corresponding target device may display or reproduce the first content or the second content received from the processor 340 on the display of the corresponding target device. The processor 340 may further extract various pieces of setting information of the corresponding target device from the received first content.

According to an embodiment, when the content provision condition is met, the processor 340 may change setting parameters of the corresponding target device based on the extracted setting information.

For example, when the first content includes a setting temperature (for example, information on management of a partial refrigerator temperature) of the refrigerator 202*b*, the processor 340 may change the setting information of the refrigerator 202*b* into the corresponding partial refrigerator setting temperature based on the setting temperature.

Further, for example, when the first content includes a washing time (for example, information on a spin drying time) of the washing machine 202*c*, the processor 340 may set or change the spin drying time of the washing machine 202*c* into extracted setting information (for example, about 5 minutes) based on the washing time.

According to an embodiment, the processor 340 may analyze a user's content provision pattern repeated by the content provision condition and store the content provision pattern in the memory 320. The processor 340 may further receive a user's location information or environment information detected through at least one sensor included in each of the controlled devices 202*a* to 202*e*. The processor 340 may determine whether at least a part of the received user's location information or environment information corresponds to the user's content provision pattern having been analyzed and stored. When the received user's location information or environment information corresponds to the user's content provision pattern, the processor 340 may transmit at least one of the first content and the second content to at least one target device.

Figure 4:
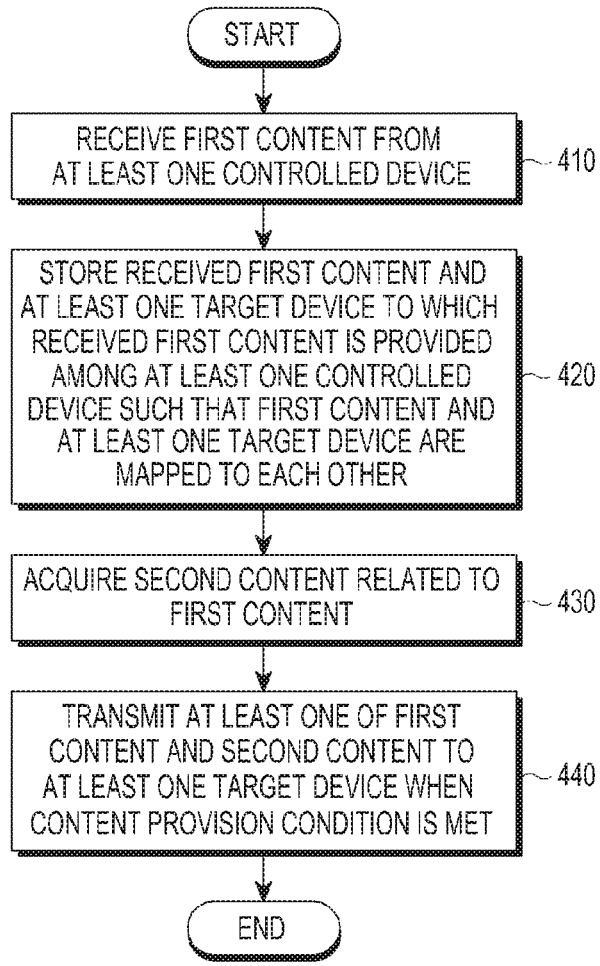
FIG. 4 is a flowchart of a content provision method of a server within a home network, according to an embodiment of the present disclosure.

FIG. 4 is a flowchart of a content provision method of a server within a home network, according to an embodiment of the present disclosure.

Referring to FIG. 4, a content provision method of the server 306 is provided.

In step 410, the server 306 receives first content generated from at least one of the controlled devices 202*a* to 202*e*. For example, at least one controlled device may be controlled to generate the first content by capturing at least a part of the content that is being displayed or streamed through an output device of the at least one controlled device according to a control of the control device 201 and to transmit the generated first content to the server 306.

In step 420, the server stores the received first content and at least one target device to which the received first content is to be provided among the controlled devices 202*a* to 202*e*, such that the first content and the target device are mapped to each other. For example, the server 306 generates a first meta information table related to the received first content such that at least one target device to which the first content is to be provided is mapped to the received first content. For example, the server 306 extracts first metadata from the received first content. The server 306 generates the first meta information table by matching the extracted first metadata and a content provision condition corresponding to the first content.

In step 430 the server 306 acquires second content related to the first content. For example, the server 306 acquires the second content related to the first content from the Internet based on the generated first meta information table.

In step 440, when the content provision condition is met, the server 306 transmits at least one of the first content and the second content to at least one target device. At least one target device outputs at least one of the first content and the second content received from the server through an output device (for example, a display and/or an audio module) of the corresponding target device.

Figure 5:
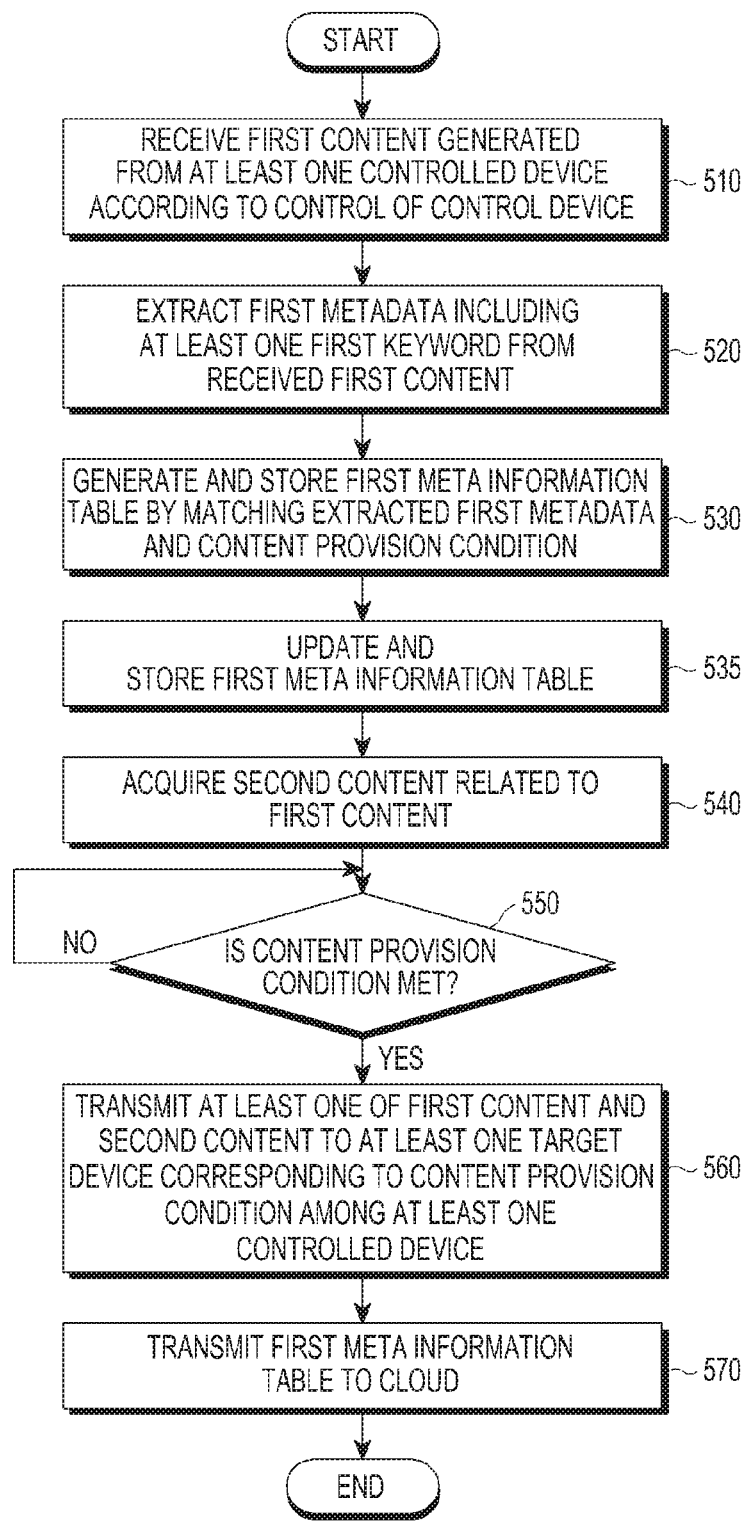
FIG. 5 is a flowchart of a content provision method of a server within a home network, according to an embodiment of the present disclosure.

FIG. 5 is a flowchart of a content provision method of a server within a home network, according to an embodiment of the present disclosure.

Referring to FIG. 5, a content provision method of the server 306 is provided.

In step 510 the server 306 receives first content generated from at least one of the controlled devices 202*a* to 202*e* according to a control of the control device 201.

For example, when the user discovers useful information while watching a broadcast through the smart TV 202*a*, the user may directly control the smart TV 202*a* to generate the first content by capturing at least a part of the corresponding broadcast or may transmit a content generation control signal to the smart TV 202*a* to capture at least a part of the corresponding broadcast (for example, the first content) through at least one control device 201. The smart TV 202*a* having received the control signal generates first content by capturing at least a part of the content according to the content generation control signal received from the control device 201 and transmits the first content to the server 306. The server 306 receives the generated first content from the smart TV 202*a* through the first communication interface 312.

According to an embodiment, the first content may include at least one of a broadcast program, a video, text (for example, an article, a posting in a blog, or a webpage), and audio data (for example, a sound source or sound data).

In step 520 the server 306 extracts first metadata including at least one keyword from the received first content. For example, the server 306 extracts first metadata related to the first content from the received first content.

According to an embodiment, the extracted first metadata may include tag information included in the received first content, EPG information, at least one first keyword extracted from at least a part of the tag information or the EPG information, or a combination thereof.

In step 530 the server 306 generates a first meta information table by matching the extracted first metadata and a content provision condition and stores the first meta information table in the memory 320.

According to an embodiment, the content provision condition may include at least one of a device type of at least one target device mapped in accordance with the extracted first metadata, data on an area in which the at least one target device is located, and time data for operating the at least one target device.

For example, the server 306 generates the first meta information table illustrated in Table 1 by mapping at least one of at least one first keyword extracted from the first content with a device type of at least one target device to which the first content is to be provided, an area in which at least one target device is installed, and a time at which at least one target device is to be operated and stores the generated first meta information table in the memory 320.

In step 535 the server 306 edits and/or updates the first meta information table by a user's input and stores the first meta information table in the memory. The server 306 may edit and/or update the first meta information table by performing at least one of addition, change, and deletion of the first metadata extracted from the first content by a user's input through an input/output interface. Step 535 is not limited thereto and may be performed at any point after step 530.

In step 540 the server 306 acquires second content related to the first content. For example, the server 306 acquires the second content related to the first content from the Internet based on the first meta information table extracted from the first content. For example, when the first content corresponds to articles related to baseball and at least one first keyword extracted from the first content includes "baseball" or "Korean series", the server 306 acquires the second content (for example, a video of the corresponding game, highlights, or a game result) related to the first content from the Internet based on at least one extracted first keyword.

In step 550 the server 306 determines whether the content provision condition is met. When the content provision condition is met in step 550, the server 306 performs step 560. When the content provision condition is not met, the server 306 periodically or aperiodically repeats step 550.

For example, when the user approaches the area in which at least one target device set in the first meta information table is installed, or when the time, at which at least one target device set in the first meta information table, arrives, the server 306 determines that the content provision condition is met.

In step 560 the server 306 transmits at least one of the first content and the second content to at least one target device corresponding to the content provision condition among the controlled devices 202a to 202e.

For example, the server 306 transmits at least one of the first content and the second content to at least one target device stored in the first meta information table. The server 306 may control at least one target device to output at least one of the first content and the second content through an output device of the corresponding target device.

In step 570 the server 306 transmits the first meta information table to the cloud 208.

The server 306 transmits the first meta information table to the cloud 208 through the second communication interface 314 to upload the first meta information table. Accordingly, even when the user generates the first content outside, the user can generate and store the useful first content anywhere and at any time by uploading and/or downloading the first content through the cloud 208.

Figure 6A:
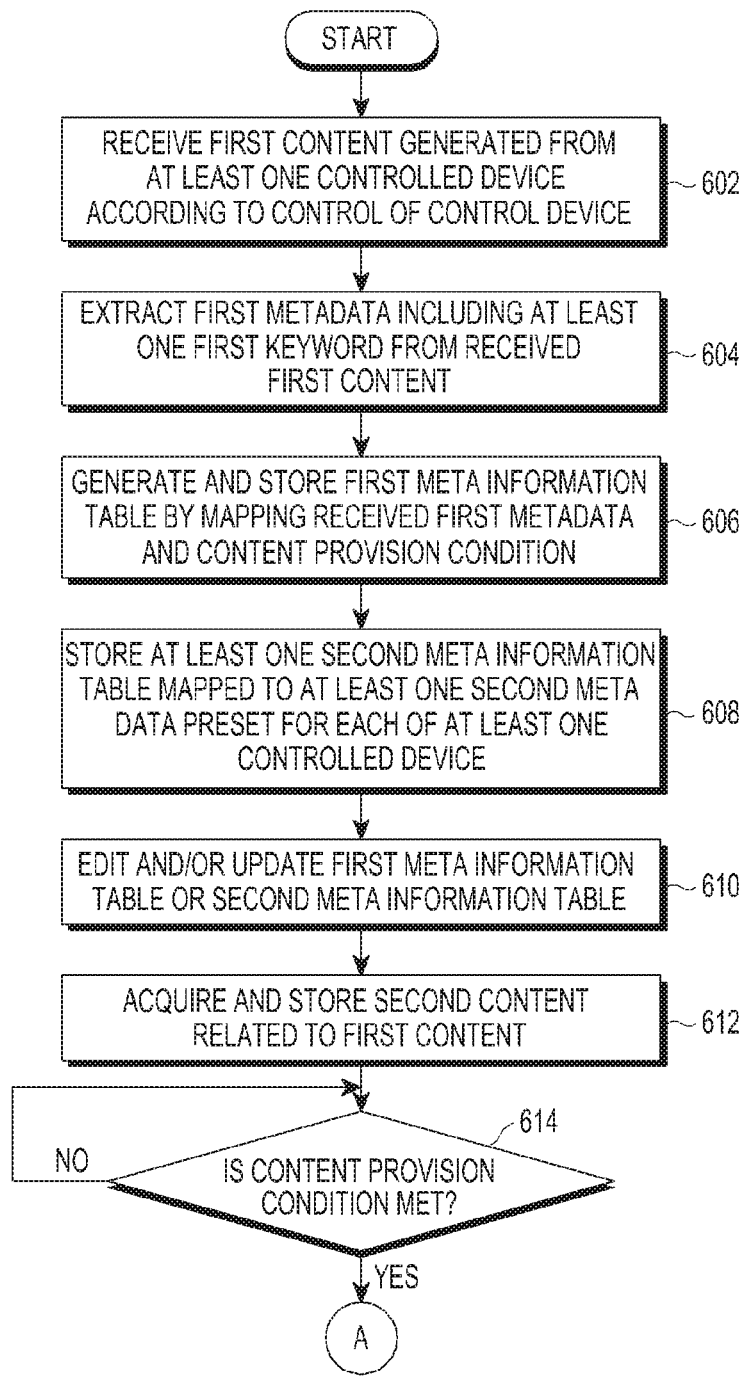
FIGS. 6A and 6B are flowcharts of a content provision method of a server within a home network, according to an embodiment of the present disclosure.
Figure 6B:
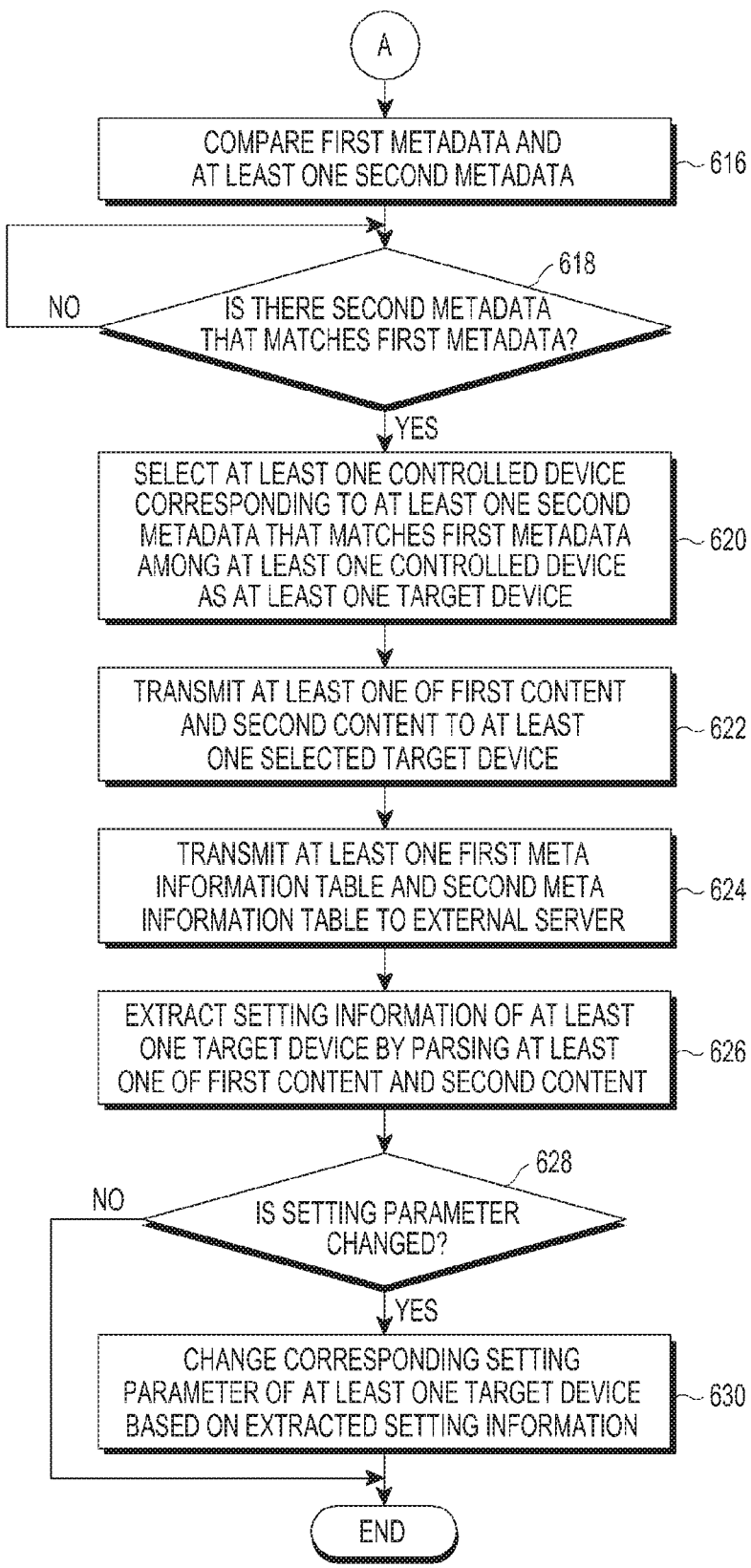

FIGS. 6A and 6B are flowcharts of a content provision method of a server within a home network, according to an embodiment of the present disclosure.

Referring to FIGS. 6A and 6B, a content provision method of a server 306 within a home network is provided. Referring to FIG. 6A, in step 602 the server receives first content generated from at least one controlled device (for example, the smart device or IoT devices 202a to 202e) according to a control of the control device (for example, at least one of the smart phone 201a and the remote controller 201b).

In step 604 the server 306 extracts first metadata including at least one keyword from the received first content. For example, the server 306 extracts first metadata related to the first content from the received first content.

In step 606 the server 306 generates a first meta information table by matching the extracted first metadata and a content provision condition and stores the first meta information table in the memory 320.

Steps 602 to 606 are the same as steps 510 to 530 of FIG. 5, respectively and, thus, a detailed description thereof will be omitted.

In step 608 the server 306 pre-stores at least one preset second meta information table to which at least one second metadata preset for each of the controlled devices 202a to 202e is mapped.

For example, the server 306 makes a request for the preset second meta information table pre-stored in each of the controlled devices 202a to 202e and receives the preset second meta information table from at least one of the controlled devices 202a to 202e. The server 306 stores the preset second meta information table received from each of the controlled devices 202a to 202e in the memory 320. Alternatively, the server 306 downloads the preset second meta information table for at least one of the controlled devices 202a to 202e through the Internet and stores the second meta information table in the memory 320.

According to an embodiment, the preset second meta information table may be provided from a manufacturing company of each controlled device.

In step 610 the server 306 edits and/or updates the first meta information table or the preset second meta information table by a user's input and stores the first meta information table or the preset second meta information table in the memory 320.

The server 306 edits and/or updates the first meta information table by performing at least one of addition, change, and deletion of the first meta data extracted from the first content by a user's input through the input/output interface 330. Similarly, the server 306 edits and/or updates the preset second meta information table by performing at least one of the addition, change, and deletion of the second metadata included in the preset second meta information table by a user's input through the input/output interface 330. Step 610 is not limited thereto and may be performed at any point after operation 608.

In step 612 the server 306 acquires second content related to the first content.

In step 614 the server 306 determines whether the content provision condition is met.

Steps 612 and 614 are the same as steps 540 and 550 of FIG. 5, respectively and, thus, a detailed description thereof will be omitted.

Referring to FIG. 6B, in step 616 the server 306 may compare the first metadata with at least one second metadata.

The server 306 may compare at least one first keyword included in the first metadata with at least one second keyword included in the at least one second metadata.

In step 618 the server determines whether there is at least one second metadata that matches the first metadata. When there is at least one second metadata that matches the first metadata in step 618, the server 306 performs step 620. When there is no second metadata that matches the first metadata, the server 306 periodically or aperiodically repeats step 618.

The server 306 compares the generated first meta information table and at least one preset second meta information table and automatically sets at least one controlled device including at least one second keyword that is the same as the first keyword included in the first metadata as a device type of at least one target device corresponding to the extracted first keyword.

For example, when the first keyword extracted from the received first content is "refrigerator", "cooling", or "recipe", the server 306 compares at the extracted first keyword and at least one second keyword included in at least one preset second metadata and automatically sets a device type corresponding to a second keyword that matches the extracted first keyword among at least one second keyword as the device type of at least one target device corresponding to the first keyword extracted from the first content.

In step 620 the server 306 may select at least one of the controlled devices 202a to 202e corresponding to at least one preset second metadata that matches the first metadata as the at least one target device.

In step 622 the server 306 transmits at least one of the first content and the second content to the at least one selected target device.

For example, the server 306 transmits at least one of the first content and the second content to the at least one selected target device. The server 306 may control the at least one target device to output at least one of the first content and the second content through an output device of the corresponding target device.

In step 624 the server 306 transmits at least one of the first meta information table and the preset second meta information table to the cloud 208.

The server 306 transmits the first meta information table to the cloud 208 through the second communication interface 314 to upload the first meta information table. Further, the server 306 transmits the at least one preset second meta information table to the cloud 208 through the second communication interface 314 to update the at least one preset second meta information table.

Accordingly, even when the user generates first content outside, the user can generate and store useful content anywhere and at any time by uploading and/or downloading the content through the cloud 208. Further, even when the user does not manually set at least one target device for the first content according to a user's input, the target device may be automatically set based on the second meta information table.

In step 626 the server 306 extracts various pieces of setting information of the at least one target device by parsing at least one of the first content and the second content.

In step 628 the server 306 determines whether the setting parameters of the at least one target device are changed based on the extracted setting information of the at least one target device. When the extracted setting information is different from the corresponding setting information of the at least one target device in step 628, the server 306 performs step 630. When the extracted setting information is the same as the corresponding setting information of the at least one target device, the server 306 may end the content provision operation.

In step 630 the server 306 changes the corresponding setting parameters of the at least one target device based on the extracted setting information.

When the content provision condition is met the server 306 changes the setting parameters of the corresponding target device based on the extracted setting information. For example, when the first content includes a setting temperature (for example, information on management of a partial refrigerator temperature) of the refrigerator 202b, the server 306 changes setting information of the refrigerator 202b into the corresponding partial refrigerator setting temperature based on the setting temperature. For example, when the first content includes a washing time (for example, information on a spin drying time) of the washing machine 202c, the server 306 sets or changes the spin drying time of the washing machine 202c into extracted setting information (for example, about 5 minutes) based on the washing time.

According to various embodiments, an electronic device for providing content may include a communication interface that receives first content generated by at least one controlled device according to a control of a control device, and a processor configured to store the received first content and at least one target device to which the received first content is provided among the at least one controlled device such that the first content and the at least one target device are mapped to each other, to acquire second content related to the first content, and, when a content provision condition is met, to transmit at least one of the first content and the second content to the at least one target device.

According to various embodiments, the processor may be configured to extract first metadata from the received first content, to generate a first meta information table by mapping the extracted first metadata and the content provision condition, and to store the generated first meta information table in the memory.

According to various embodiments, the extracted first metadata may include tag information included in the received first content, EPG information, at least one first keyword extracted from at least a part of the tag information or the EPG information, or a combination thereof.

According to various embodiments, the content provision condition may include at least one of a device type of the at least one target device mapped with the extracted first metadata, area data on an area in which the at least one target device is installed, and time data on a time at which the at least one target device is to be operated.

According to various embodiments, the processor may be further configured to determine whether the content provision condition is met based on the first meta information table.

According to various embodiments, the processor may be configured to determine that the content provision condition for the received first content is met when the time at which the at least one target device is to be operated arrives based on the time data in the first meta information table.

According to various embodiments, the processor may be configured to determine that the content provision condition for the received first content is met when a user approaching detection signal is received from the at least one target device based on the area data in the first meta information table.

According to various embodiments, the processor may be configured to update the first meta information table by performing at least one of an addition, change, and deletion of the first metadata corresponding to the first content according to a user's input.

According to various embodiments, the processor may be further configured to transmit the generated or updated first meta information table to an external server.

According to various embodiments, the processor may be further configured to store at least one second meta information table including at least one second metadata preset for each of the at least one controlled device, to determine whether there is at least one second metadata that matches the first metadata among the at least one second metadata, to select one of the at least one controlled device corresponding to the at least one second metadata that matches the first metadata as a target device when there is the at least one second metadata that matches the first metadata, and to transmit at least one of the first content and the second content to the selected target device.

According to various embodiments, the processor may be configured to update the at least one second meta information table by performing at least one of an addition, change, and deletion of the at least one second metadata according to a user's input.

According to various embodiments, the processor may be further configured to transmit the at least one stored or updated second meta information table to a cloud.

According to various embodiments, the processor may be further configured to analyze a user's content provision pattern learned by the content provision condition, to receive a user's location or environment information detected through at least one sensor included in each of the at least one controlled device from the at least one controlled device, to determine whether at least a part of the received user's location or environment information meets the content provision condition corresponding to the analyzed content provision pattern, and, when the received user's location or environment information meets the content provision condition corresponding to the analyzed content provision pattern, to transmit at least one of the first content and the second content to the at least one target device.

According to various embodiments, the processor may be further configured to extract setting information of the at least one target device by parsing at least one of the first content and the second content, to compare the extracted setting information and a setting parameter of the at least one target device corresponding to the extracted setting information, and, when a value of the extracted setting information is different from a value of the setting parameter of the at least one target device corresponding to the extracted setting information based on a result of the comparison, to change the value of the setting parameter of the at least one target device into the value of the extracted setting information.

Figure 7:
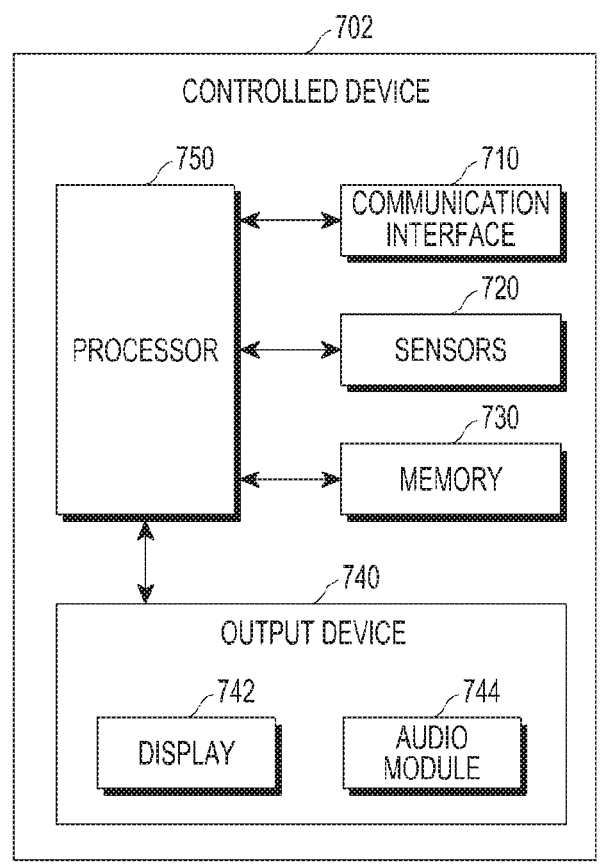
FIG. 7 is a block diagram of a controlled device within a home network, according to an embodiment of the present disclosure.

FIG. 7 is a block diagram of a controlled device within a home network, according to an embodiment of the present disclosure.

Referring to FIG. 7, a controlled device 702 is provided. The controlled device 702 includes a communication interface 710, sensors 720, a memory 730, an output device 740, and a processor 750. The communication interface 710 establishes a communication connection with an external electronic device. For example, the communication interface 710 may establish a communication connection with at least one of the control device 201, the controlled devices 202*a* to 202*e*, the server 306, and the cloud 208. The communication interface 710 receives a content generation control signal from the control device 201. The communication interface 710 transmits generated first content to the server 306 according to the content generation control signal. Alternatively, the communication interface 710 receives first content generated by another controlled device or second content related to the first content from the server 306.

The sensors 720 detect a change in a surrounding environment of the controlled device 702 or detect the user approaching the controlled device 702 through at least one of the sensors 720. Various pieces of environment information or location information of the user approaching detected through the sensors 720 are transmitted to the server 306 through the communication interface 710.

The sensors 720 measure a physical quantity or detect the operating state of the controlled device 702 and convert the measured or detected information into an electrical signal. The sensors 720 may include at least one of a gesture sensor, a gyro sensor, an atmospheric pressure sensor, a magnetic sensor, an acceleration sensor, a grip sensor, a proximity sensor, a color sensor (e.g., a red, green, and blue (RGB) sensor), a biometric sensor, a temperature/humidity sensor, an illumination sensor, and an ultraviolet (UV) sensor. Additionally or alternatively, the sensors 720 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensors 720 may further include a control circuit for controlling one or more sensors included therein. The controlled device 702 may further include a processor configured to control the sensors 720 as a part of, or separately from, the processor 750, and may control the sensors 720 while the processor 750 is in a sleep state.

The memory 730 stores instructions or data related to at least one other element of the controlled device 702. The memory 730 may include a part or entirety of the memory 130 illustrated in FIG. 1. The memory 730 stores the first content generated by capturing at least a part of the content that is being output according to a control of the control device 201. The memory 730 stores the first content generated by another controlled device or the second content related to the first content received from the server 306. Further, the memory 730 stores setting information extracted from the first content received from the server 306.

The output device 740 outputs a predetermined control according to a control of the control device 201. The output device 740 includes at least one of the display 742 and the audio module 744. Further, the output device 740 outputs at least one of the first content and the second content received from the server 306. For example, the output device 740 displays or reproduces one of the first content and the second content through the display 742. Alternatively, the output device 740 outputs one of the first content and the second content through the audio module 744. Alternatively, the output device 740 outputs one of the first content and the second content through both the display 742 and the audio module 744 at the same time.

The processor 750 provides overall control of the controlled device 702. The processor 750 may include a part or entirety of the processor 120 illustrated in FIG. 1. The processor 750 outputs the content through the output device 740 according to a control of the user or the control device 201. The processor 750 generates the first content by capturing at least a part of the content that is being output through the output device 740 according to a content generation control signal of the user or the control device 201. The processor 750 transmits the generated first content to the server 306 through the communication interface 710. The processor 750 stores the generated first content in the memory 730.

Further, the processor 750 receives the first content generated by another controlled device or the second content related to the first content transmitted from the server 306 through the communication interface 710. The processor 750 displays information on whether to output at least one of the received first content and second content on the display 742. For example, the processor 750 displays a message that inquires about whether to output at least one of the received first content and second content on the display 742 in a popup message form. The processor 750 may or may not output at least one of the received first content and second content according to a user's input in response to the message. For example, when the output of at least one of the received first content and second content is selected according to a user's input, the processor 750 outputs at least one of the received first content and second content through the output device 740. Further, when the output of at least one of the received first content and second content is rejected according to a user's input, the processor 750 ends the process without outputting at least one of the received first content and second content.

In addition, the processor 750 receives setting information of the controlled device 702 extracted from the first content generated by another controlled device or the second content related to the first content from the server 306. When the setting information is received, the processor 750 displays information on whether to change a corresponding setting parameter into the received setting information on the display 742. For example, the processor 750 displays a message that inquires about whether to change the corresponding setting parameter into the received setting information on the display 742 in a popup message form. The processor 750 changes the corresponding setting parameter in the received setting information or ends the process according to a user's input. For example, when the change of the corresponding setting parameter into the received setting information is selected according to a user's input, the processor 750 changes a value of the corresponding setting parameter into a value of the received setting information based on the received setting information. Further, when the change of the corresponding setting parameter into the received setting information is rejected according to a user's input, the processor 750 ends the process without changing the value of the corresponding setting parameter.

The controlled devices 202a to 202e may operate as both the controlled device 702 and the control device 201. For example, the smart phone 201a of the control device 201 may operate as both the control device 201 and the controlled device 702.

Figure 8:
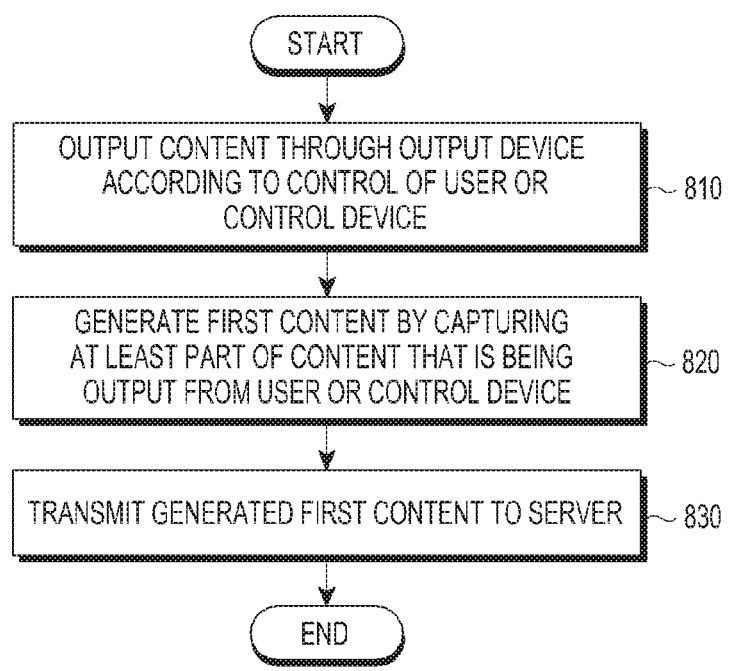
FIG. 8 is a flowchart of a content provision method of a controlled device within a home network, according to an embodiment of the present disclosure.

FIG. 8 is a flowchart of a content provision method of a controlled device within a home network, according to an embodiment of the present disclosure.

Referring to FIG. 8, a content provision method of the controlled device 702 that generates first content is provided.

In step 810, the controlled device 702 outputs content through an output device 740 according to a control of the user or the control device 201. For example, the user may make a control to output a predetermined broadcast program through the controlled device 702 (for example, the TV 202a).

In step 820 the controlled device 702 generates first content by capturing at least one part of the content that is being output through the output device 740 according to a control of at least one of the user and the control device 201.

For example, when the user discovers useful information while watching the controlled device 702, the user may directly control the controlled device 702 to generate the first content by capturing at least a part of the corresponding broadcast or may transmit a content generation control signal to the controlled device 702 to capture at least a part of the corresponding broadcast through at control device 201. The controlled device 702 having received the content generation control signal generates first content by capturing at least a part of the content according to the content generation control signal received from the control device 201. The controlled device 702 stores the generated first content in the memory 730.

According to an embodiment, the first content may include, for example, a broadcast program, a video, text (for example, articles, postings in a blog, or a webpage), and audio data (for example, a sound source or voice data).

In step 830 the controlled device 702 transmits the generated first content to the server 306 through the communication interface 710.

Figure 9:
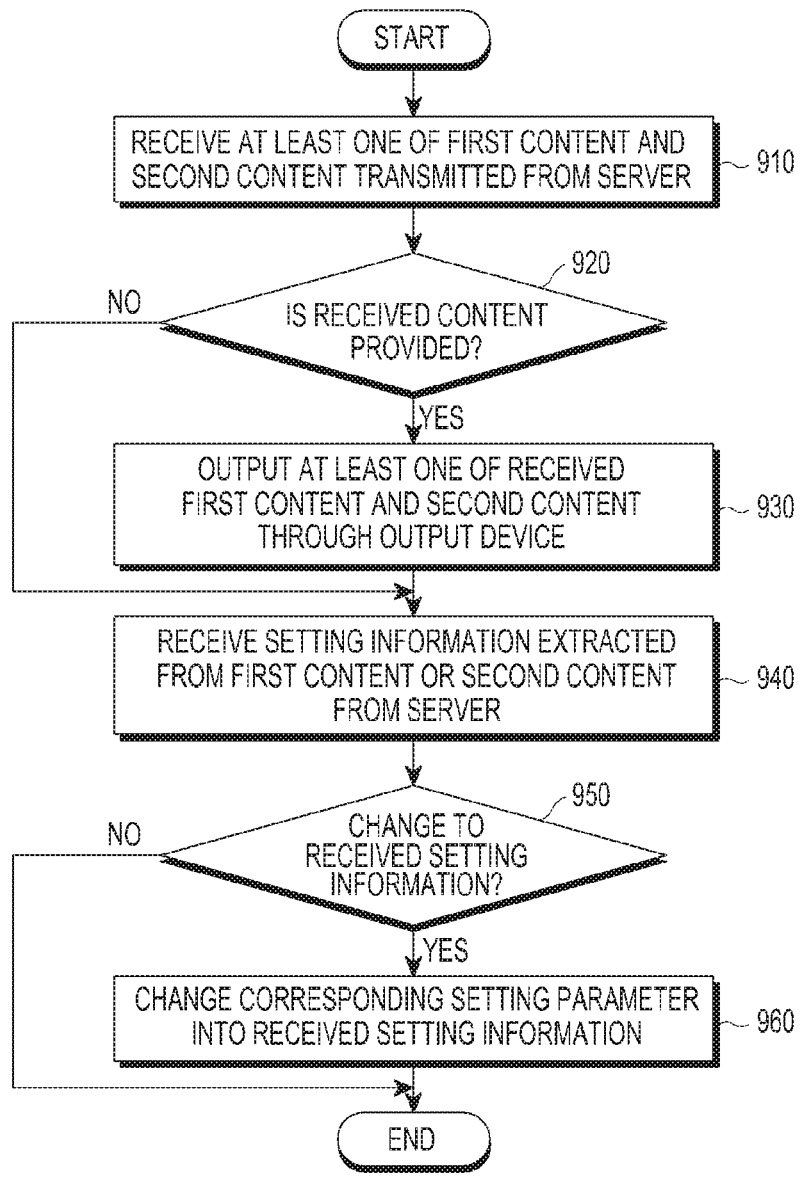
FIG. 9 is a flowchart of a content provision method of a controlled device within a home network, according to an embodiment of the present disclosure.

FIG. 9 is a flowchart of a content provision method of a controlled device within a home network, according to an embodiment of the present disclosure.

Referring to FIG. 9, a content provision method of the controlled device 702 that receives content is provided. Hereinafter, the controlled device 702 that receives the content is referred to as a target device.

In step 910 the target device receives at least one of first content generated by another controlled device and second content related to the first content transmitted from the server 306.

According to an embodiment, the first content may include, for example, a broadcast program, a video, text (for example, articles, postings in a blog, or a webpage), and audio data (for example, a sound source or voice data).

According to an embodiment, the second content may include, for example, a broadcast program, a video, text (for example, articles, postings in a blog, or a webpage), audio data (for example, a sound source or voice data) related to the first content.

In step 920 the target device determines whether to output at least one of the received first content and second content. When it is determined to output at least one of the received first content and second content in step 920, the target device performs step 930. When it is determined to not provide at least one of the received first content and second content, the server 306 performs step 940.

The target device displays a message that inquires about whether to output at least one of the received first content and second content on the display 742 in a popup message form. The target device determines whether to output at least one of the received first content and second content according to a user's input. For example, when the output of at least one of the received first content and second content is selected according to a user's input, the target device determines to output at least one of the received first content and second content through the output device 740. Further, when the output of at least one of the received first content and second content is rejected according to a user's input, the target device determines to not provide at least one of the received first content and second content.

In step 930 the target device outputs at least one of the received first content and second content through the output device 740. For example, the target device displays or reproduces at least one of the received first content and second content through the display 742 and/or the audio module 744.

In step 940 the target device receives, from the server 306, setting information of the target device extracted from at least one of the first content generated by another controlled device or the second content related to the first content.

In step 950 when the setting information of the target device is received from the server 306, the target device determines whether to change a corresponding setting parameter into the received setting information. The target device performs step 960 when it is determined to change the corresponding setting parameter into the received setting information in step 950, and ends the content provision method of the target device when it is determined not to change the corresponding parameter into the received setting information.

The target device displays a message that inquires about whether to change the corresponding setting parameter into the received setting information on the display 742 in a popup message form. The target device determines whether to change the corresponding setting parameter into the received setting information according to a user's input. For example, when the change of the corresponding setting parameter into the received setting information is selected according to a user's input, the target device determines to change the corresponding setting parameter into the received setting information. Further, when the change of the corresponding setting parameter into the received setting information is rejected according to a user's input, the target device determines to end the process without changing the corresponding setting parameter.

When it is determined to change the corresponding setting parameter and the received setting information is different from the corresponding setting parameter, the target device automatically changes a value of the corresponding setting parameter into a value of the received setting information in step 960.

FIGS. 10A to 10F illustrate an interface of a control device for providing content within a home network, according to an embodiment of the present disclosure.

Figure 10A:
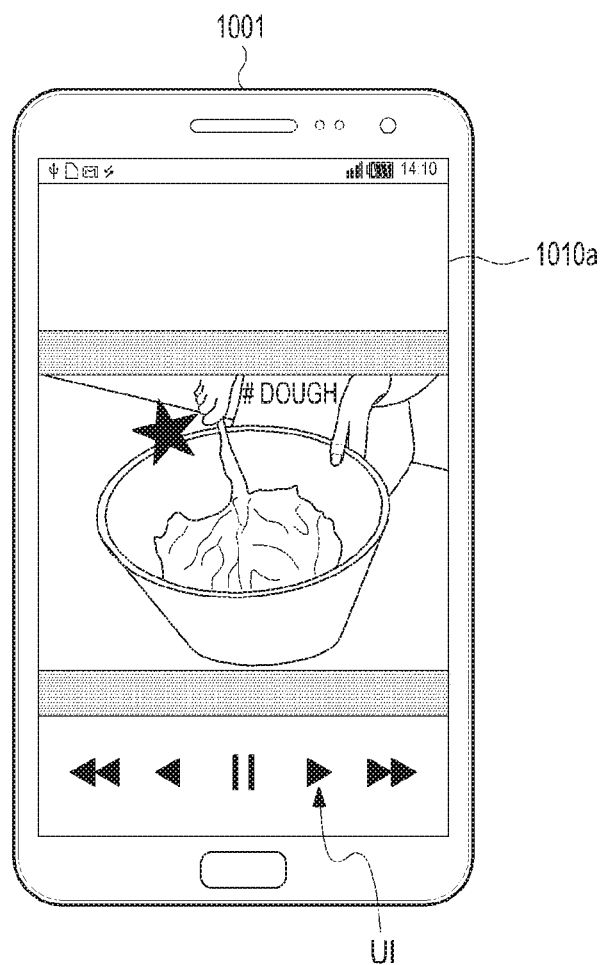
FIGS. 10A to 10F illustrate an interface of a control device for providing content within a home network, according to an embodiment of the present disclosure.

Referring to FIG. 10A, the control device 1001 is provided. It is assumed that the control device 1001 serves as both the control device and the controlled device. The control device 1001 provides a user interface (UI) (for example, a plurality of icons indicating play, stop, previous, next, etc.) to capture the first content. The control device 1001 generates first content by capturing at least a part of content 1010a (for example, a cooking broadcast program) that is currently output through the UI according to a user's input. The generated first content is stored in the memory 730.

Figure 10B:
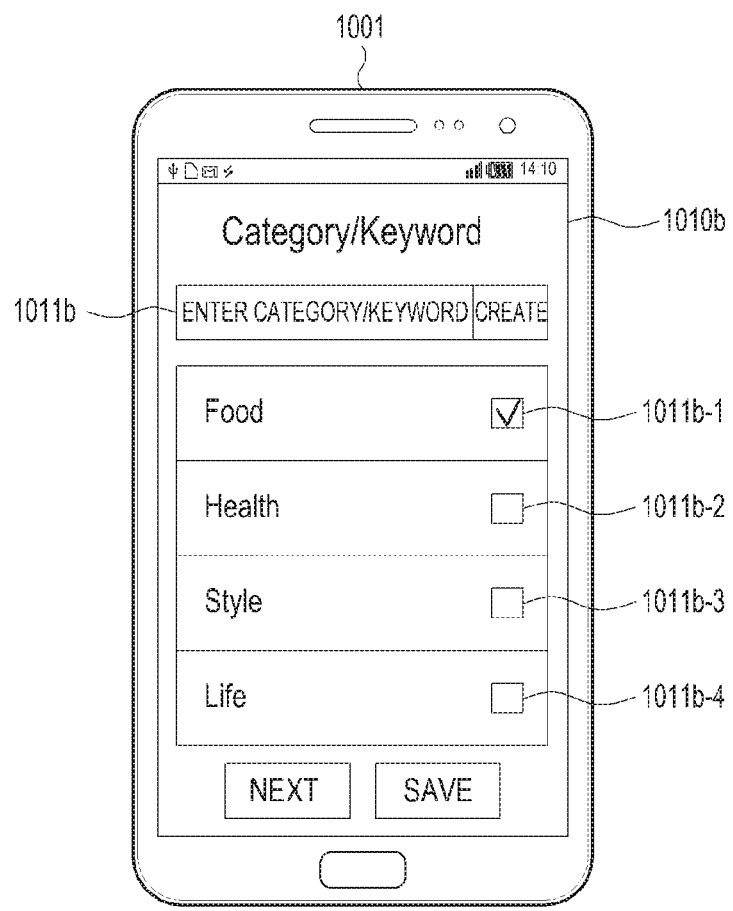

Referring to FIG. 10B, when the generated first content is stored, a category/keyword related to the first content may be also stored. For example, the control device 1001 may input the category/keyword related to the first content or display a selectable screen 1010b on the display. The control device 1001 stores the category/keyword related to the first content by directly inputting the category/keyword into an input window 1011b displayed on the screen 1010b. Further, the control device 1001 may select and store at least one of check boxes 1101b-1 to 1101b-4 corresponding to the category/keyword, which has been preset in the control device 1001 and provided, displayed on the screen 1010b.

Figure 10C:
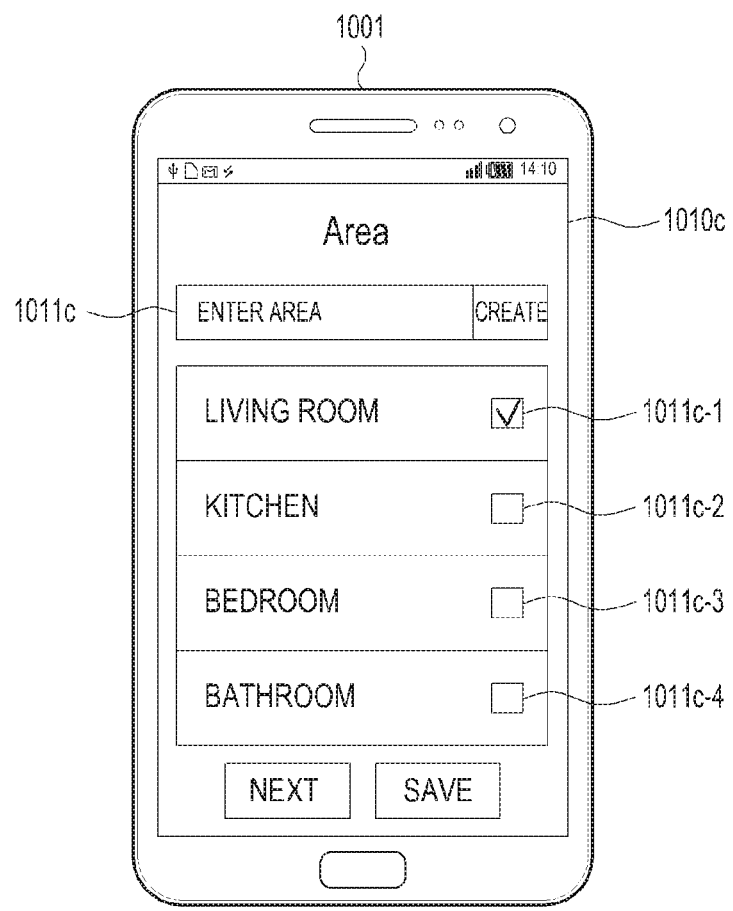

Referring to FIG. 10C, when storing the generated first content, the control device 1001 receives an area in which at least one target device to which the first content is to be provided is installed among the controlled devices 202a to 202e from the user and stores the area. For example, the control device 1001 displays, on the display, a screen 1010c on which data on the area in which at least one target device to be mapped to the first content is installed, can be input or selected. The control device 1001 stores the data on the area in which at least one target device to be mapped to the first content is installed, by directly inputting the data into an input window 1011c displayed on the screen 1010c. Further, the control device 1001 may select and store at least one of check boxes 1011c-1 to 1011c-4 corresponding to the data on the area in which at least one target device is installed, displayed on the screen 1010c, which has been preset in the control device 1001.

Figure 10D:
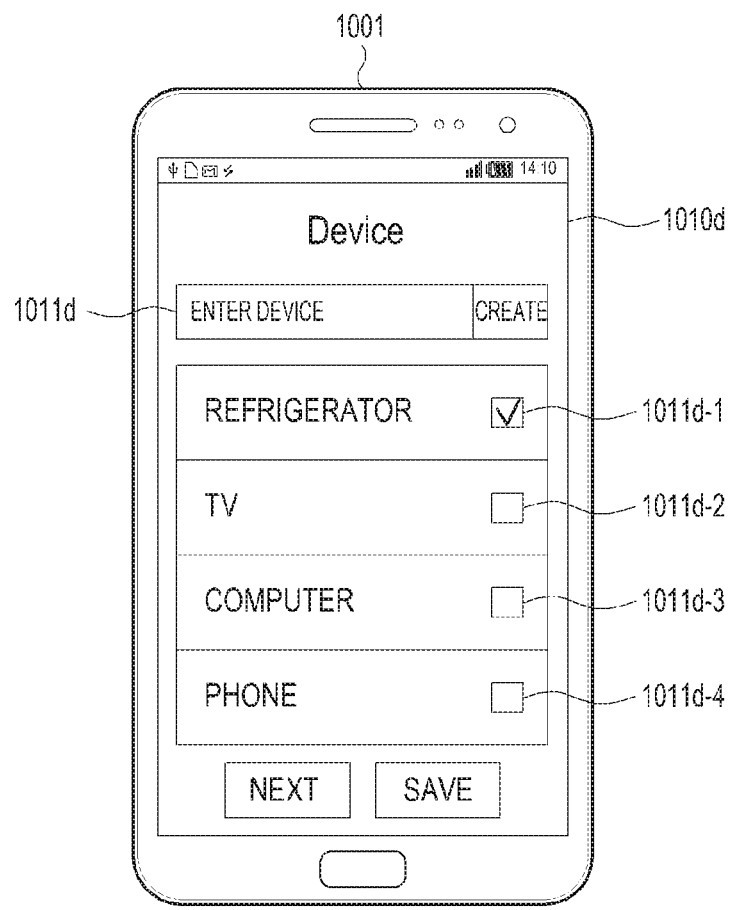

Referring to FIG. 10D, when storing the generated first content, the control device 1001 receives a device type of at least one target device to which the first content is to be provided among the controlled devices 202a to 202e from the user and stores the device type. For example, the control device 1001 displays a screen 1010d on which data on the device type of at least one target device to be mapped to the first content can be input or selected on the display. The control device 1001 stores the data on the device type of at least one target device to be mapped to the first content by directly inputting the data into an input window 1011d. Further, the control device 1001 may select and store at least one of the check boxes 1011d-1 to 1011d-4 corresponding to the data on the device type of at least one target device, displayed on the screen 1010d, which has been preset in the control device 1001.

Figure 10E:
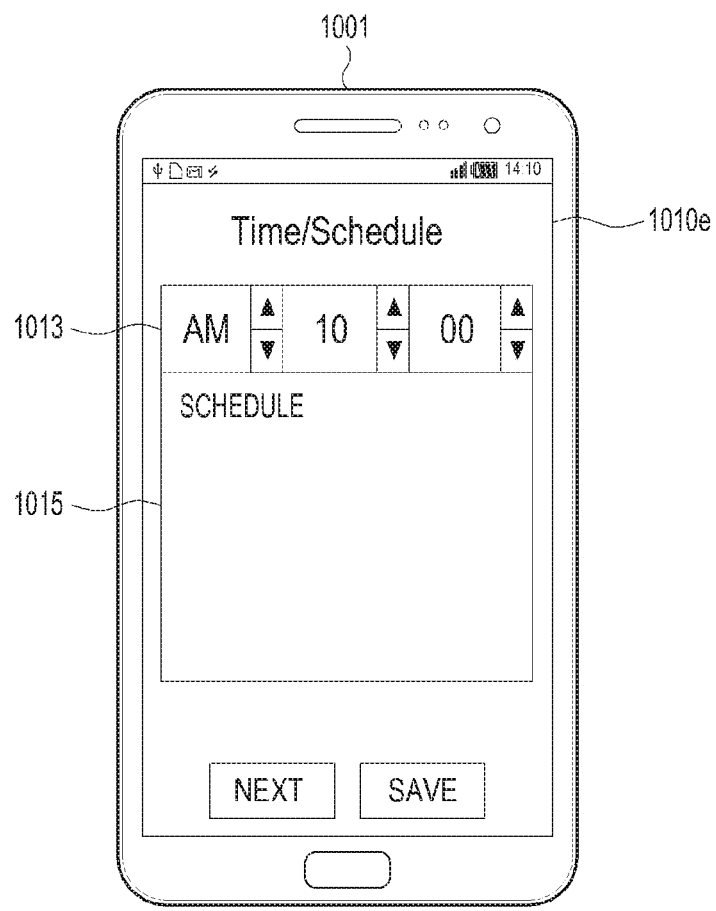

Referring to FIG. 10E, when storing the generated first content, the control device 1001 receives an operation time of at least one target device to which the first content is provided among the controlled devices 202a to 202e from the user and stores the operation time. For example, the control device 1001 displays, on the display, a screen 1010e on which data on the operation time of at least one target device to be mapped to the first content can be input. The control device 1001 receives and stores the data on the operation time of at least one target device through a time setting interface 1013 displayed on the screen 1010e. Further, a memo input window 1015 is provided on the screen 1010e in which a schedule for the operation time of at least one target device can be recorded.

Figure 10F:
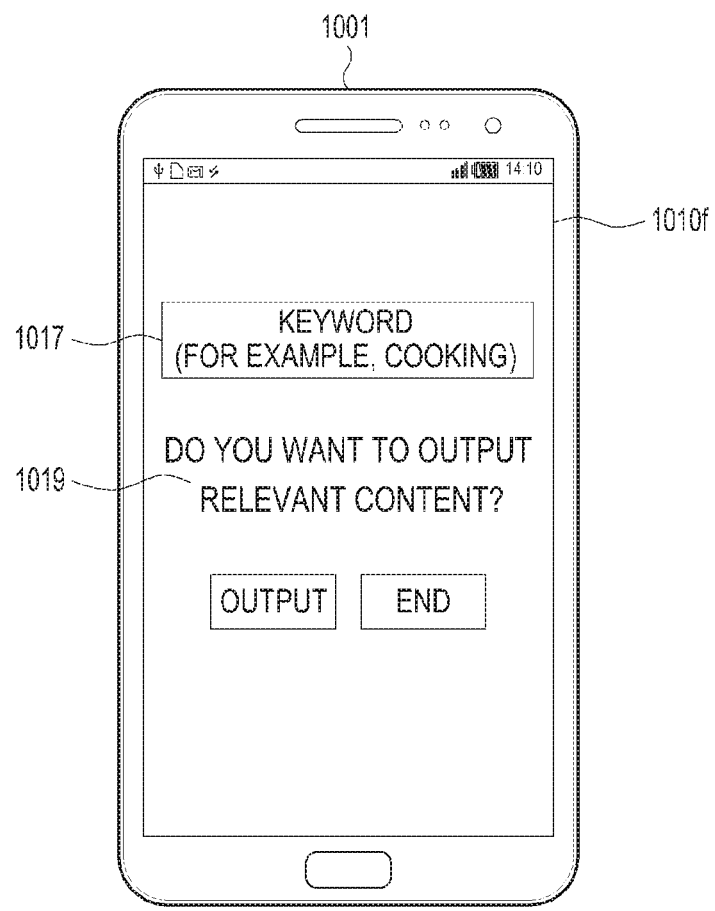

Referring to FIG. 10F, the control device 1001 displays, on the display, a screen 1010f that inquires about whether to output at least one of the first content generated by another of the controlled devices 202a to 202e or the second content related to the first content. For example, the control device 1001 displays, on the screen 1010f, an input window 1017 in which a keyword (for example, "cooking") related to the first content can be input and a message 1019 that inquires about whether to output at least one of the first content related to the keyword input into the input window 1017 and the second content related to the first content. Further, an output button icon or an end button icon for selecting whether to output at least one of the first content and/or the second content is also displayed on the screen 1010f. When the output button icon is selected by the user, at least one of the first content and the second content is output through an output device of the control device 1001. Further, when the end button icon is selected by the user, the first content and the second content are not output.

Figure 11:
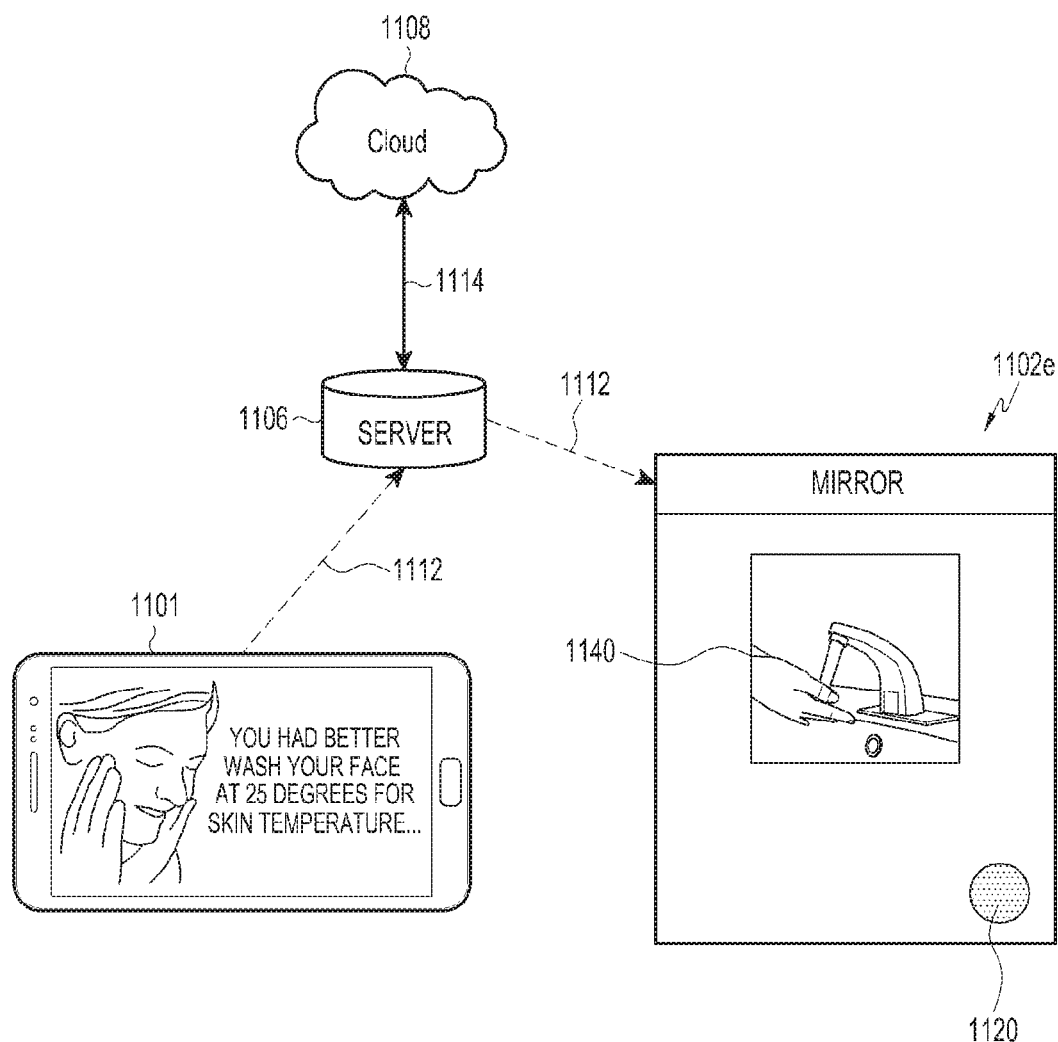
FIG. 11 illustrates a method of executing content provided to a target device among a plurality of controlled devices within a home network, according to an embodiment of the present disclosure.

FIG. 11 illustrates a method of executing content provided to a target device among a plurality of controlled devices within a home network, according to an embodiment of the present disclosure.

Referring to FIG. 11, when first content (for example, face washing-related content) generated by a smart phone 1101 serving as both the controlled device and the control device is transmitted to a server 1106, the server 1106 generates a first meta information table related to the first content. When a content provision condition is met based on the generated first meta information table, the server 1106 transmits the first content, through a first network 1112, to a target device, such as a display mirror 1102e corresponding to the first content. The server 1106 may transmit the first content to a cloud 1108 through a second network 1114. Alternatively, the target device 1102e detects the user approaching through a sensor 1120 (for example, a motion sensor, a proximity sensor, or an infrared sensor) included in the target device 1102e and transmits a detection signal for the user approaching to the server 1106. When the server 1106 receives the detection signal from the target device 1102e, the server 1106 transmit the first content mapped to the target device 1102e to the target device 1102e through the first network 1112. When the first content is received from the server 1106, the target device 1102e outputs the first content through an output device 1140 (for example, at least one of a display and an audio module). Further, the target device 1102e may display a message that inquiries about whether to output the first content on the corresponding display before outputting the first content. The target device 1102e outputs or ends the first content according to an input of an "output" or "end" button icon selected by the user in response to the displayed message. Further, when the display is not included in the target device 1102e, the server 1106 may transmit the first content to another device, such as a smart phone, to output the first content.

Figure 12A:
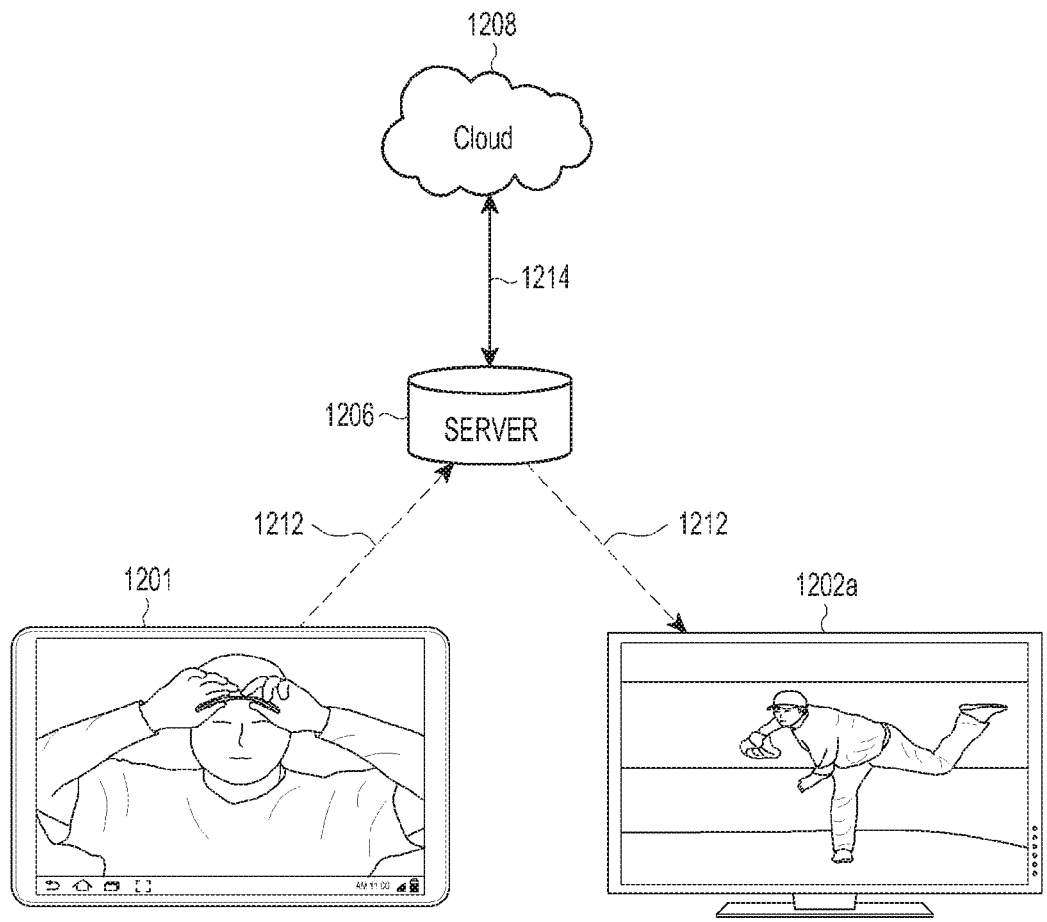
FIGS. 12A to 12C illustrate a method of executing content provided to a target device among a plurality of controlled devices within a home network, according to an embodiment of the present disclosure.
Figure 12B:
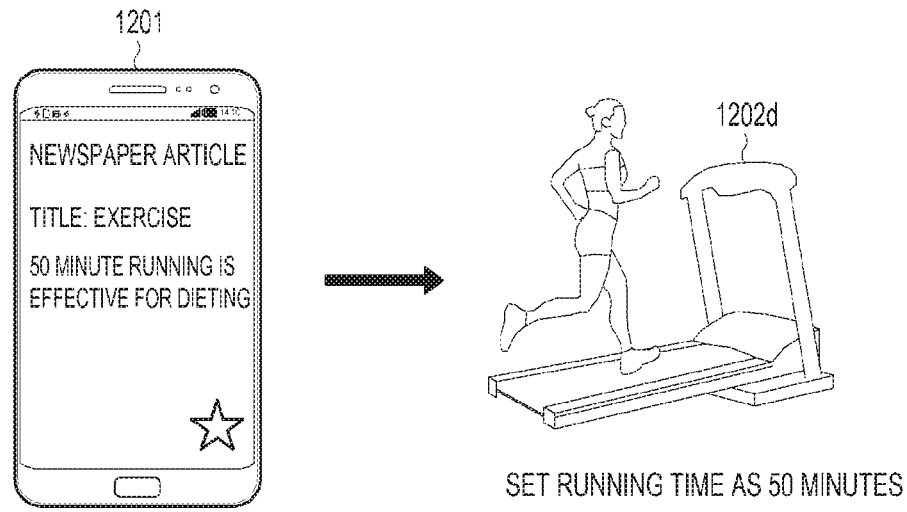
Figure 12C:
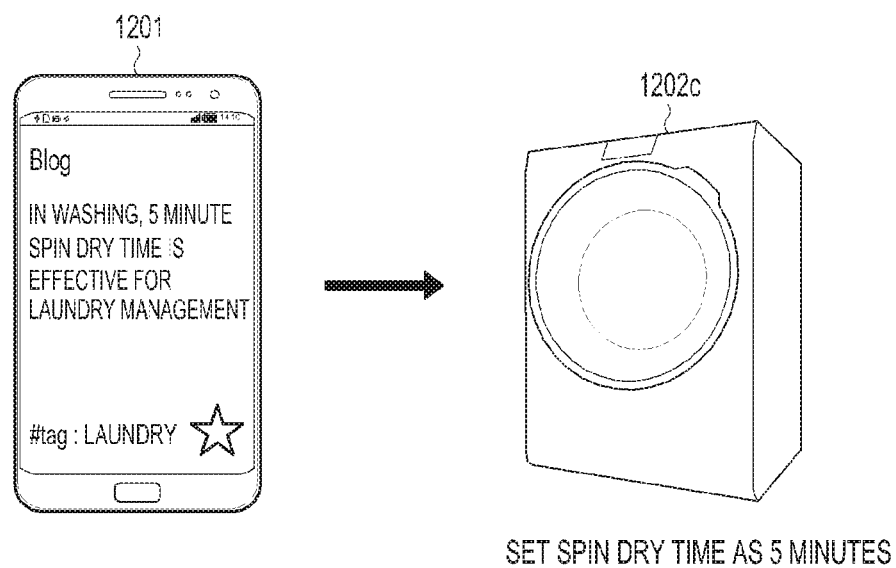

FIGS. 12A to 12C illustrate a method of executing content provided to a target device among a plurality of controlled devices within a home network, according to an embodiment of the present disclosure.

Referring to FIGS. 12A to 12C, a smart phone 1201 serving as both a controlled device and a control device, a server 1206, a cloud 1206, and target devices, such as a smart TV 1202a, a washing machine 1202c, and a running machine 1202d, are provided.

Referring to FIG. 12A, when first content (for example, a baseball game broadcast) generated by the smart phone 1201 is transmitted to the server 1206, the server 1206 collects second content (for example, highlights of the baseball game broadcast) related to the first content. The server 1206 generates a first meta information table related to at least one of the first content and the second content. When a content provision condition is met based on the generated first meta information table, the server 1206 transmits at least one of the first content (for example, the baseball game broadcast) and the second content (for example, the highlights of the baseball game) to a target device, such as the smart TV 1202a, through a first network 1212. The server 1206 may transmit at least one of the first content and the second content to the cloud 1208, through a second network 1214.

Referring to FIG. 12B, when the first content (for example, exercise-related information) generated by the smart phone 1201 is transmitted to the server 1206, the server 1206 extracts setting information of a target device corresponding to the first content, such as the running machine 1202d, from the first content. The server 1206 generates a first meta information table related to the first content. When a content provision condition is met based on the generated first meta information table, the server 1206 transmits the first content and the extracted setting information of the running machine 1202d, through the first network 1212. The server 1206 may transmit at least one of the first content and the extracted setting information of the running machine 1202d to a cloud 1208, through the second network 1214. When the first content or the extracted setting information is received from the server 1206, the running machine 1202d outputs the first content through an output device (for example, at least one of a display and an audio module) of the running machine 1202d or sets the setting information of the running machine 1202d as the received setting information. For example, when the extracted setting information corresponds to a running time (for example, 50 minutes), the running machine 1202d automatically sets the setting information of the running time as "50 minutes".

Referring to FIG. 12C, when the first content (for example, laundry-related information) generated by the smart phone 1201 is transmitted to the server 1206, the server 1206 extracts setting information of a target device corresponding to the first content, such as the washing machine 1202c, from the first content. The server 1206 generates a first meta information table related to the first content. When a content provision condition is met based on the generated first meta information table, the server 1206 transmits the first content and the extracted setting information of the washing machine 1202c, through the first network 1212. The server 1206 may also transmit at least one of the first content and the extracted setting information of the washing machine 1202c to the cloud 1208, through the second network 1214. When the first content or the extracted setting information is received from the server 1206, the washing machine 1202c outputs the first content through an output device (for example, at least one of a display and an audio module) of the washing machine 1202c or sets the setting information of the washing machine 1202c as the received setting information. For example, when the extracted setting information corresponds to a spin drying time (for example, 5 minutes), the washing machine 1202c automatically sets the setting information of the spin drying time as "5 minutes".

Figure 13A:
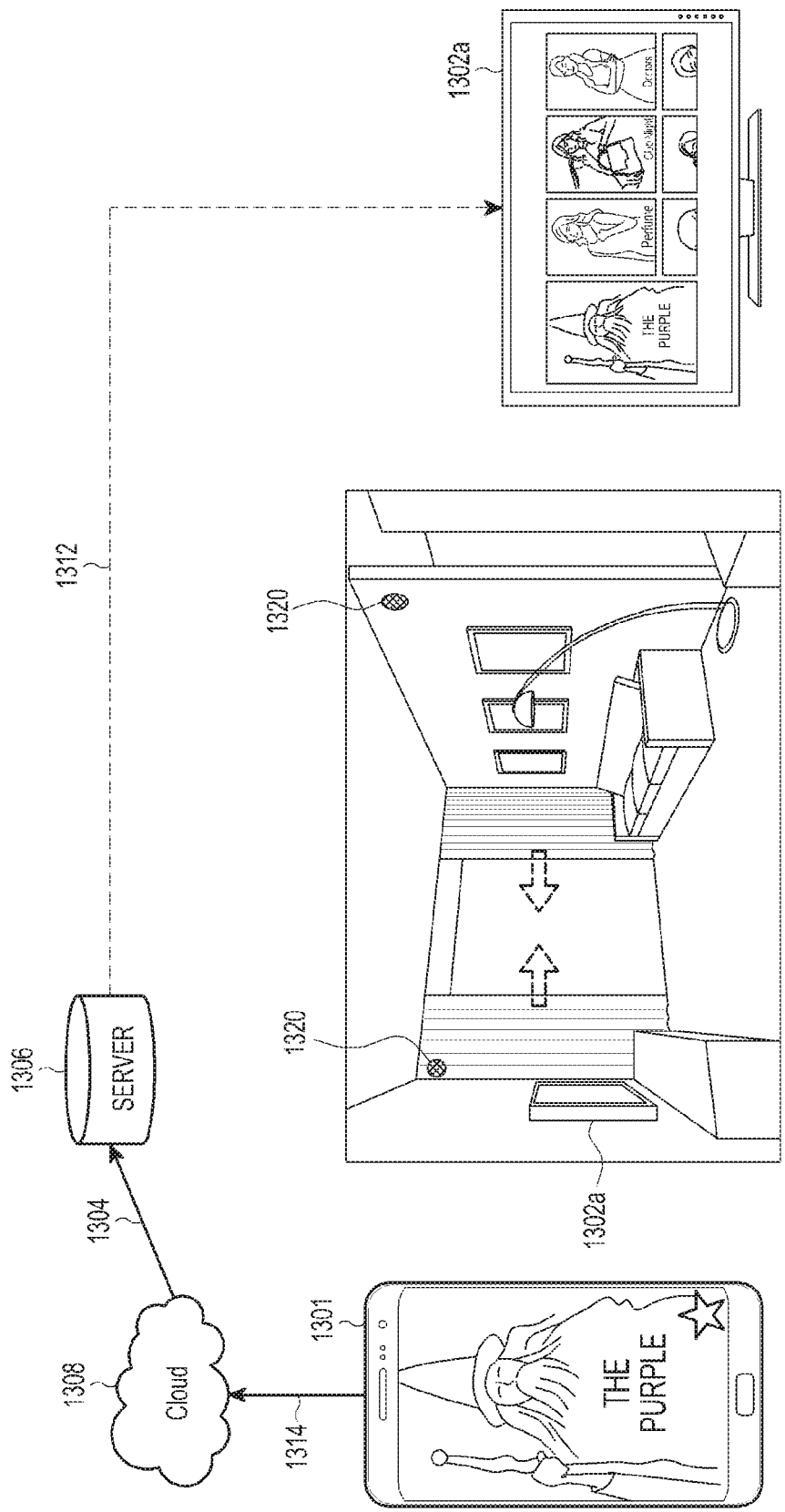
FIGS. 13A and 13B illustrate a method of executing content provided to a target device among a plurality of controlled devices within a home network, according to an embodiment of the present disclosure.
Figure 13B:
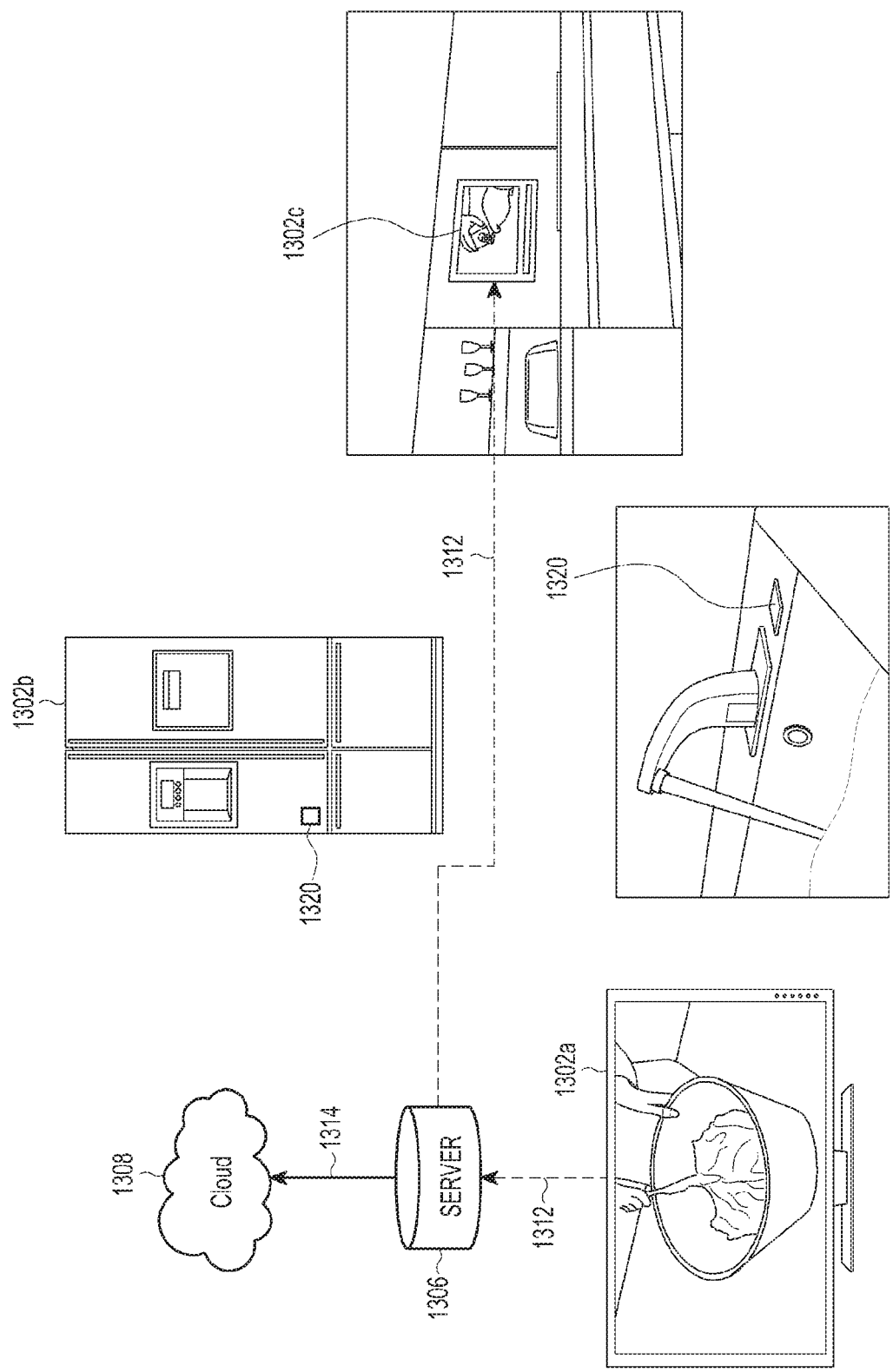

FIGS. 13A and 13B illustrate a method of executing content provided to a target device among a plurality of controlled devices within a home network, according to an embodiment of the present disclosure.

Referring to FIG. 13A, a controlled device, such as a smart phone 1301, a server 1306, a cloud 1308, and a target device, such as a smart TV 1302a, are provided. The server 1306 is able learn, analyze, and store a user's content provision pattern related to the first content generated by the smart phone 1301 and, when a condition corresponding to the stored content provision pattern is met, output the first content to a target device corresponding to the first content. For example, when a predetermined pattern is repeated in connection with a time or illumination under which the user watches a movie, the server 1306 is able to learn, analyze, and store the repeated pattern as the user's content provision pattern. When the content provision condition (for example, illumination, time, or whether the user approaches) corresponding to the learned, analyzed, and stored content provision pattern is met, the server 1306 automatically outputs the first content to the target device corresponding to the content provision condition. For example, when an operation pattern is repeated in which the user watches the generated first content (for example, a movie) through the smart TV 1302*a* with the lights off at 9:00 every night, the server 1306 is able to learn, analyze, and store the user's content provision pattern. For example, the server 1306 periodically or aperiodically receives a detection signal through at least one sensor 1320. For example, the server 1306 analyzes a current state of the user through a plurality of detection signals (for example, illumination, time, or whether the user approaches) received from at least one sensor 1320. For example, when the user's current state matches the learned and stored content provision pattern, that is, when the learned and stored time arrives, the user's current state matches the learned and stored illumination, or the user approaches the smart TV 1302*a*, the server 1306 transmits the first content (i.e., the movie) to the smart TV 1302*a*. The smart TV 1302*a* outputs the first content received from the server 1306.

Referring to FIG. 13B, a controlled device, such as the smart TV 1302*a*, the server 1306, the cloud 1308, and target devices, such as a refrigerator 1302*b* and a display device 1302*c*, are provided. The server 1306 is able to learn, analyze, and store a user's content provision pattern related to the first content generated by a controlled device, such as the smart TV 1302*a* and, when a condition corresponding to the stored content provision pattern is met, output the first content to a target device corresponding to the first content, such as the display 1302*c* located at a cabinet in a kitchen. For example, when a predetermined pattern is repeated in connection with a time, a place, and use of a controlled device involved in cooking, the server 1306 may learn, analyze, and store the repeated pattern as the user's content provision pattern. When the content provision condition (for example, illumination, time, the used controlled device, or whether the user approaches) corresponding to the learned, analyzed, and stored content provision pattern is met, the server 1306 automatically outputs the first content to the display 1302*c* corresponding to the content provision condition. For example, when an operation pattern is repeated in which the user watches the generated first content (for example, cooking-related information) through the controlled device, such as the smart TV 1302*a*, at 6:00 every night in the kitchen, the server 1306 is able to learn and analyze the operation pattern, and store the learned and analyzed operation pattern as the user's content provision pattern. For example, the server 1306 periodically or aperiodically receives a detection signal through at least one sensor 1320 installed in a space where a sink is located or installed in the refrigerator 1302*b*. For example, the server 1306 may analyze the user's current state through a plurality of detection signals (for example, time, place, use of a controlled device, or whether the user approaches) received from at least one sensor 1320. For example, when the user's current state matches the learned and stored content provision pattern, that is, when the time learned and stored by the user arrives, the user's current state matches the learned and stored place, the user approaches the refrigerator 1302*b*, or a door of the refrigerator 1302*b* is opened or closed, the server 1306 transmits the first content (for example, cooking-related information) to the display 1302*c* located at the cabinet in the kitchen. The display 1302*c* outputs the first content received from the server 1306.

Figure 14:
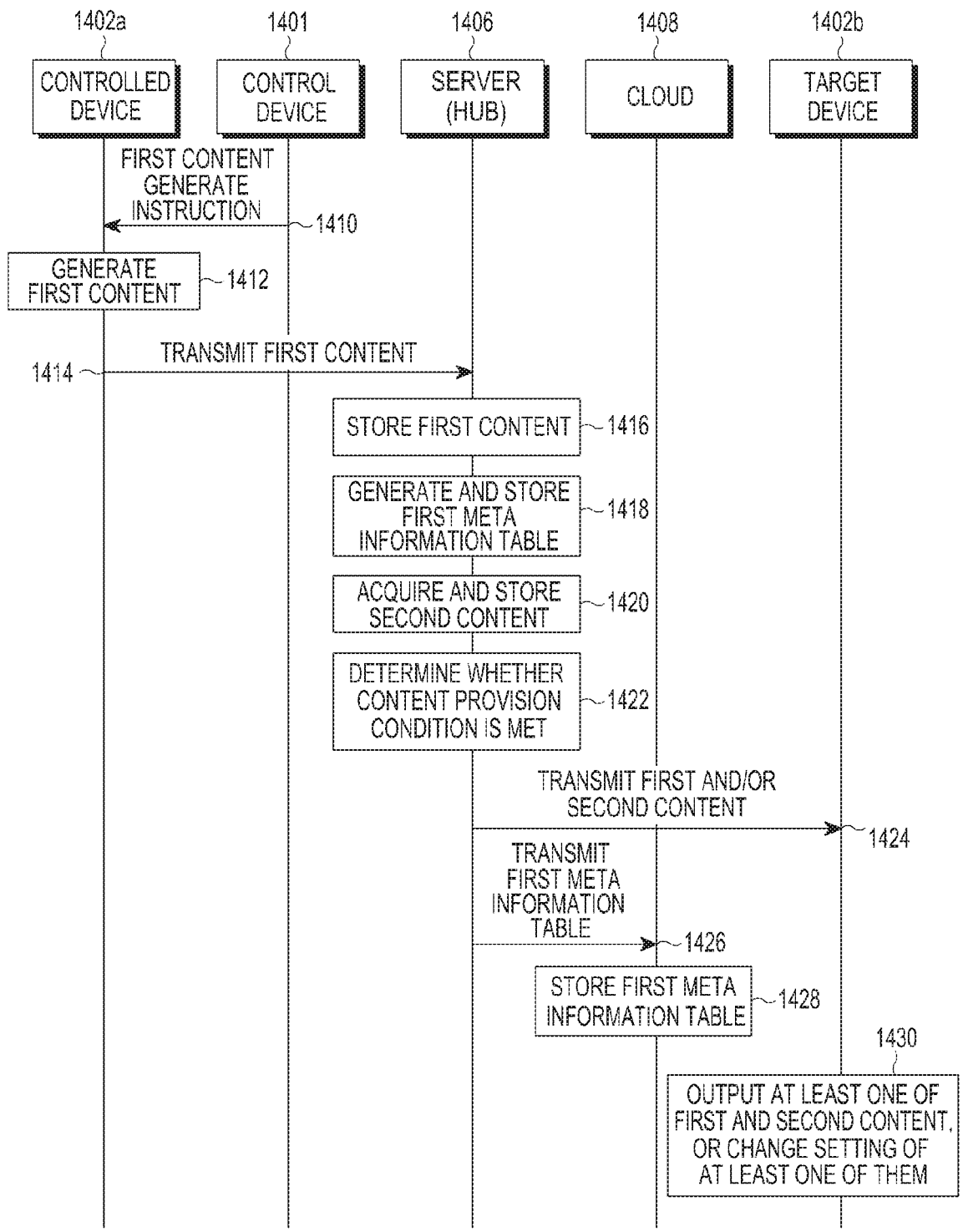
FIG. 14 is a flowchart of a content provision method within a home network, according to an embodiment of the present disclosure.

FIG. 14 is a flowchart of a content provision method within a home network, according to an embodiment of the present disclosure.

Referring to FIG. 14, a content provision method within the smart home network including a control device 1401, a controlled device 1402*a*, a target device 1402*b*, a server 1406, and a cloud 1408 is provided. In step 1410 the control device 1401 transmits a control signal including an instruction for capturing content that is being streamed in the controlled device 1402*a*, to the controlled device 1402*a*.

According to an embodiment, when the controlled device 1402*a* may also operate as the control device 1401, in this case step 1410 may be omitted.

In step 1412 the controlled device 1402*a* generates first content by capturing the content that is being streamed or output in the controlled device 1402*a* according to the control signal transmitted from the control device 1401. The first content may include, for example, a broadcast program, a video, text (for example, articles, postings in a blog, or a webpage) and audio data (for example, a sound source or voice data).

In step 1414 the controlled device 1402*a* transmits the generated first content to the server 1406 (for example, a hub) through the first network 212. The first network may provide short range communication-based data. For example, the first network may include at least one of Wi-Fi, Bluetooth, NFC, ZigBee, Z-Wave, and GNSS.

In step 1416 the server 1406 receives the generated first content from the controlled device 1402*a* and stores the first content in the memory 320 of the server 1406.

In step 1418 the server 1406 generates a first meta information table by mapping the first content and a target device to which the first content is provided, and stores the first meta information table in the memory 320 of the server 1406.

According to an embodiment, the server 1406 extracts first metadata from the received first content and generates the first meta information table by matching the pre-extracted first metadata and a content provision condition corresponding to the first content.

In step 1420 the server 1406 acquires second content related to the generated first content through the Internet based on the generated first meta information table and stores the second content in the memory 320 of the server 1406.

In step 1422 the server 1406 determines whether the content provision condition is met.

According to an embodiment, the content provision condition includes at least one of a device type of the target device 1402*b* mapped to the received first content, time data on a time at which the target device 1402*b* mapped to the received first content is to be operated, and area data on an area in which the target device 1402*b* mapped to the received first content is installed. For example, when a time at which the target device 1402*b* is to be operated according to the content provision condition arrives, or a user's entry into or approach to an area in which the target device 1402*b* is installed according to the content provision condition is detected, the server 1406 determines that the content provision condition is met. When the content provision condition is not met, the server 1406 periodically or aperiodically determines whether the content provision condition is met.

In step 1424 when the content provision condition is met, the server 1406 transmits at least one of the first content and the second content to the target device 1402*b*.

According to an embodiment, the target device 1402*b* may determine whether a display function is supported and, when the display function is not supported, the server 1406 may additionally transmit at least one of the received first content and second content to another device, such as the smart phone 201*a*, that supports the display function.

In step 1426 the server 1406 transmits the generated first meta information table to the cloud 1408, through the second network 214.

According to an embodiment, the server 1406 may additionally transmit at least one of the first content and the second content to the cloud 1408.

According to an embodiment, the second network may provide a packet data or Internet protocol-based service. For example, the second network may include at least one of a computer network (for example, a LAN or a WAN), Internet, and a telephone network.

In step 1428 the cloud 1408 stores the first meta information table.

According to an embodiment, the cloud 1408 may additionally store at least one of the first content and the second content received from the server 1406.

According to an embodiment, when the first content is received from the server 1406, the cloud 1408 may acquire the second content related to the first content and store the acquired second content.

According to an embodiment, the external server 1408 transmits at least one of the first content and the second content to the target device 1402*b* based on the first meta information table.

In step 1430 the target device 1402*b* outputs at least one of the first content and the second content or changes a corresponding setting parameter according to setting information of the target device 1402*b* extracted from at least one of the first content and the second content.

The term "module" as used herein may refer to a unit including one of hardware, software, and firmware or a combination of two or more of them. The term "module" may be used interchangeably with the terms "unit", "logic", "logical block", "component", and "circuit". The "module" may be a minimum unit of an integrated component element or a part thereof. The "module" may be a minimum unit for performing one or more functions or a part thereof. The "module" may be mechanically or electronically implemented. For example, the "module" may include at least one of an application-specific integrated circuit (ASIC) chip, a field-programmable gate arrays (FPGA), and a programmable-logic device for performing operations which have been known or are to be developed.

According to an embodiment, at least part of the devices (for example, modules or functions thereof) or the method (for example, operations) according to the present disclosure may be implemented by a command stored in a computer-readable storage medium in a programming module form. The instruction, when executed by one or more processors may cause the one or more processors to execute the function corresponding to the instruction. The computer-readable storage medium may be the memory 130.

The computer readable recoding medium includes a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a read only memory (ROM), a random access memory (RAM), a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements may be executed sequentially, in parallel, repeatedly, or in a heuristic manner. Furthermore, some operations may be executed in a different order or may be omitted, or other operations may be added.

According to an embodiment, a storage medium storing instructions is provided. The instructions are configured to, when executed by at least one processor, the processor to perform at least one operation. The at least one operation includes an operation of receiving first content generated by at least one controlled device according to a control of a control device. an operation of storing the received first content and at least one target device to which the received first content is provided among the at least one controlled device such that the first content and the at least one target device are mapped to each other; an operation of acquiring second content related to the first content; and an operation of transmitting at least one of the first content and the second content to the at least one target device when a content provision condition is met.

Various embodiments disclosed herein are provided merely to easily describe technical details of the present disclosure and to help provide an understanding of the present disclosure, and are not intended to limit the scope of the present disclosure. Accordingly, the scope of the present disclosure, which is defined, not by the detailed description and embodiments, but by the appended claims and their equivalents, should be construed as including all modifications or various other embodiments based on the technical idea of the present disclosure.

What is claimed is:

1. An electronic device for providing content in a home network, the electronic device comprising:
    a communication circuit;
    a memory; and
    a processor configured to:
        receive, via the communication circuit, at least part of audio or video data from a first device of the home network which is outputting the audio or video data;
        identify first metadata associated with the audio or video data from the at least part of the audio or video data;
        identify a second device of the home network based on the first metadata;
        learn and store, in the memory, a user content provision pattern related to the at least part of the audio or video data, when the user content provision pattern is repeated in association with a content provision condition related to the second device, wherein the content provision condition related to the second device is mapped to the first metadata;
        acquire the audio or video data based on the first metadata from a third device which provides the audio or video data to the first device; and
        transmit the audio or video data to the second device for outputting the audio or video data, if the content provision condition corresponding to the user content provision pattern is met.

2. The electronic device of claim 1, wherein the processor is further configured to:

generate a first meta information table by mapping the first metadata and the content provision condition related to the second device; and store the first meta information table in the memory.

3. The electronic device of claim 1, wherein the first metadata includes at least one of tag information or electronic program guide (EPG) information included in the at least part of the audio or video data, or at least one first keyword corresponding to at least a part of the tag information or the EPG information.

4. The electronic device of claim 1, wherein the content provision condition includes at least one of a device type of the second device, area data of an area in which the second device is installed, and time data of a time at which the second device is to be operated.

5. The electronic device of claim 2, wherein the processor is further configured to identify whether the content provision condition is met based on the first meta information table.

6. The electronic device of claim 4, wherein the processor is further configured to identify that the content provision condition is met when a time corresponding to the time data in content provision condition arrives.

7. The electronic device of claim 4, wherein the processor is further configured to identify that the content provision condition is met when a user approaching detection signal indicating that a user approaches an area corresponding to the area data in the content provision condition is received.

8. The electronic device of claim 2, wherein the processor is further configured to update the first meta information table by performing at least one of an addition, change, or deletion of the first metadata according to a user's input.

9. The electronic device of claim 8, wherein the processor is further configured to transmit the first meta information table to an external server.

10. The electronic device of claim 2, wherein the processor is configured to:

identify whether a second metadata matches the first metadata based on a second meta information table, the second meta information table including the second metadata preset for at least one device of the home network; and in response to the second metadata matching the first metadata, identify a device mapped to the second metadata stored in a second meta information table as the second device.

11. The electronic device of claim 10, wherein the processor is further configured to update the second meta information table by performing at least one of an addition, change, or deletion of the second metadata according to a user's input.

12. The electronic device of claim 10, wherein the processor is further configured to transmit the second meta information table to an external server.

13. The electronic device of claim 1, wherein the processor is further configured to:

obtain a user's location or environment information via at least one sensor; and identify whether the content provision condition corresponding to the stored user content provision pattern is met based on at least a part of the user's location or environment information.

14. The electronic device of claim 1, wherein the processor is further configured to:

identify setting information associated with the second device by parsing at least part of the audio or video data;

identify whether a value of the setting information is different from a value of a setting parameter of the second device corresponding to the setting information, and in response to the value of the setting information being different from the value of the setting parameter of the second device, change the value of the setting parameter of the second device to the value of the setting information.

15. A method of providing content by an electronic device in a home network, the method comprising:

receiving at least part of audio or video data from a first device of the home network which is outputting the audio or video data;

identifying first metadata associated with the audio or video data from the at least part of the audio or video data;

identifying a second device of the home network based on the first metadata;

learning and storing, in a memory, a user content provision pattern related to the at least part of the audio or video data, when the user content provision pattern is repeated in association with a content provision condition related to the second device, wherein the content provision condition related to the second device is mapped to the first metadata;

acquiring the audio or video data based on the first metadata from a third device which provides the audio or video data to the first device; and transmitting the audio or video data to the second device for outputting the audio or video data, if the content provision condition corresponding to the user content provision pattern is met.

16. The method of claim 15, further comprising:

generating a first meta information table by mapping the first metadata and the content provision condition related to the second device; and storing the first meta information table in the memory.

17. The method of claim 16, wherein identifying the second device comprises:

identifying whether second metadata matches the first metadata based on a second meta information table, the second meta information table including the second metadata preset for at least one device of the home network; and in response to the second metadata matching the first metadata, identifying a device mapped to the second metadata stored in the second meta information table as the second device.

18. The method of claim 17, further comprising:

updating the first meta information table by performing at least one of an addition, change, or deletion of the first metadata according to a user's input; and updating the second meta information table by performing at least one of an addition, change, or deletion of the second metadata according to a user's input.

19. The method of claim 15, further comprising:

identifying setting information associated with the second device by parsing at least part of the audio or video data;

identifying whether a value of the setting information is different from a value of a setting parameter of the second device corresponding to the setting information; and in response to the value of the setting information being different from the value of the setting parameter of the second device, changing the value of the setting parameter of the second device to the value of the setting information.

20. An electronic device for providing content in a home network, the electronic device comprising:
- a communication circuit;
- an output device; and
- a processor configured to:
  - receive audio or video data from an external device;
  - receive a command for transmitting at least part of the output audio or video data to a server of the home network while outputting the audio or video data;
  - in response to receiving the command, capture the at least part of the audio or video data; and
  - transmit the at least part of the audio or video data to the server for identification of metadata of the audio or video data, and for identification of a device of the home network for outputting the audio or video data based on the metadata and a content provision condition related to the device of the home network,
  - when the content provision condition corresponding to a user content provision pattern is met, receive the audio or video data from the server, after terminating the output of the audio or video data being received from the external device; and
  - control the output device to output the audio or video data,
  - wherein the user content provision pattern related to the at least part of the audio or video data is stored when the user content provision pattern is repeated in association with the content provision condition mapped to the metadata.

* * * * *